United States Patent
Kokuryu

(10) Patent No.: US 10,222,972 B2
(45) Date of Patent: *Mar. 5, 2019

(54) MOBILE ELECTRONIC DEVICE

(71) Applicant: KYOCERA Corporation, Kyoto-shi, Kyoto (JP)

(72) Inventor: Mineto Kokuryu, Ikoma (JP)

(73) Assignee: Kyocera Corporation, Kyoto (JP)

( * ) Notice: Subject to any disclaimer, the term of this patent is extended or adjusted under 35 U.S.C. 154(b) by 519 days.

This patent is subject to a terminal disclaimer.

(21) Appl. No.: 15/000,200

(22) Filed: Jan. 19, 2016

(65) Prior Publication Data

US 2016/0132210 A1     May 12, 2016

Related U.S. Application Data

(63) Continuation of application No. 13/554,851, filed on Jul. 20, 2012, now Pat. No. 9,265,002.

(30) Foreign Application Priority Data

Jul. 22, 2011   (JP) .................................. 2011-160448

(51) Int. Cl.
  *G06F 3/0488* (2013.01)
  *G06F 1/26* (2006.01)
  (Continued)

(52) U.S. Cl.
  CPC ............ *G06F 3/0488* (2013.01); *G06F 1/263* (2013.01); *G06F 1/28* (2013.01); *G06F 1/329* (2013.01);
  (Continued)

(58) Field of Classification Search
  CPC .. G06F 3/0488; G06F 3/0412; G06F 3/04847; G06F 9/5094; G06F 1/329;
  (Continued)

(56) References Cited

U.S. PATENT DOCUMENTS 9,265,002 B2 *   2/2016   Kokuryu ............ H04W 52/0264

FOREIGN PATENT DOCUMENTS

| JP | 2001-057742 A | 2/2001 |
|---|---|---|
| JP | 2008-072464 A | 3/2008 |
| JP | 2009-111759 A | 5/2009 |

OTHER PUBLICATIONS

Non-Final Office Action dated Oct. 7, 2014 and issued by Japanese Patent Office for Japanese Patent Application No. 2011-160448.

* cited by examiner

*Primary Examiner* — Toan M Le

(57) ABSTRACT

A mobile electronic device and method are presented. An input operation by a user is received, functions are stored, a remaining battery capacity is measured, and a first image is displayed indicating the remaining battery capacity and full capacity. Battery blocks are set by dividing the full capacity, if an input is entered when the first image is displayed to provide a battery blocks set up. A capacity ratio is calculated based on capacity of each of the battery blocks and the full capacity, and a remaining battery block capacity of the battery blocks is calculated based on the capacity ratio. A function is allocated to the battery blocks, and second images are displayed indicating the capacity ratio and the remaining battery block capacity. The function allocated to the battery blocks for the battery block images is displayed, when the battery blocks are set.

20 Claims, 20 Drawing Sheets

(51) Int. Cl.

| | |
|---|---|
| *G06F 1/28* | (2006.01) |
| *G06F 1/329* | (2019.01) |
| *H01M 10/48* | (2006.01) |
| *G06F 3/0484* | (2013.01) |
| *H04W 52/02* | (2009.01) |
| *H02J 7/00* | (2006.01) |
| *G06F 3/041* | (2006.01) |
| *H04M 1/02* | (2006.01) |

(52) U.S. Cl.
CPC ........ *G06F 3/0412* (2013.01); *G06F 3/04847* (2013.01); *H01M 10/488* (2013.01); *H02J 7/0047* (2013.01); *H04M 1/0202* (2013.01); *H04W 52/0264* (2013.01); *H01M 2220/30* (2013.01); *H02J 2007/005* (2013.01); *Y02D 10/24* (2018.01); *Y02D 70/00* (2018.01); *Y02D 70/1262* (2018.01); *Y02D 70/146* (2018.01)

(58) Field of Classification Search
CPC ........ G06F 1/3203; G06F 1/3212; G06F 1/28; G06F 1/263; H04M 1/0202; H04M 10/488; H04M 2220/30; H04W 52/0264; H04W 52/0261; H04W 52/0277; H02J 7/0047; H02J 2007/005
See application file for complete search history.

Figure 4

Function Group Data

| Function Groups | Consumed Current | Functions |
|---|---|---|
| Call | XXX | Phone |
| Browser | YYY | Browsing, Auction, Photo |
| Music | - | Music Player, Electric Guitar, Recorder |
| ⋮ | ⋮ | ⋮ |

Figure 6A

Battery Setting Data

| Remaining Battery Capacity/ Whole Capacity | Battery Groups |
|---|---|
| 80/100 | Call, Browser, Music |

Figure 6B

Battery setting Data

| Battery Blocks | Remaining Battery Block Capacity/ Capacity Ratio | Battery Groups |
|---|---|---|
| First Battery Block | 56/70 | Call, Browser, Music |
| Second Battery Block | 24/30 | - |

Battery Setting Data

| Battery Blocks | Remaining Battery Block Capacity/ Capcity ratio | Battery Groups |
|---|---|---|
| First Battery Block | 68/70 | Call, Browser |
| Second Battery Block | 12/30 | Music |

MOBILE ELECTRONIC DEVICE

CROSS-REFERENCE TO RELATED APPLICATION

The present application is a continuation application of an U.S. application Ser. No. 13/554,851, filed on Jul. 20, 2012, now U.S. Pat. No. 9,265,002, which claims priority under 35 U.S.C. § 119 to Japanese Patent Application No. 2011-160448, filed on Jul. 22, 2011, entitled "MOBILE DEVICE, PROGRAM and METHOD FOR CONTROLLING A BATTERY". The content of which is incorporated by reference herein in its entirety.

FIELD

Embodiments of the present disclosure relate generally to mobile electronic devices, and more particularly relate to mobile electronic devices comprising a battery.

BACKGROUND

Mobile communication devices can operate with batteries. The mobile communication devices include circuits for respective functions thereof. The mobile communication devices are capable of allocating a battery capacity to each of the functions. However, a user may not know how long each of the functions to which the battery capacity is allocated may be used.

SUMMARY

A mobile electronic device and method for operating a mobile electronic device are presented. An input operation by a user is received, a plurality of functions is stored, a remaining battery capacity of a battery is measured, and a first image is displayed indicating the remaining battery capacity and full capacity of the battery. A plurality of battery blocks are set by dividing the full capacity of the battery into at least two, if a first input operation is entered when the first image is displayed to provide a battery blocks set up. A capacity ratio is calculated based on capacity of each of the battery blocks and the full capacity, and a remaining battery block capacity of each of the battery blocks is calculated based on the capacity ratio. At least one function is allocated to at least one of the battery blocks, and a plurality of second images are displayed indicating the capacity ratio and the remaining battery block capacity. The function allocated to one of the battery blocks for one of the second images is displayed, when the battery blocks are set.

In an embodiment, a mobile electronic device comprises a battery, an input module, a memory module, a measuring module, a display module, a setting module, a calculation module, a function allocation module, and a processor. The input module receives an input operation by a user, the memory module stores functions, and the measuring module measures a remaining battery capacity of the battery. The display module displays a first image indicating the remaining battery capacity and full capacity of the battery. The setting module sets a plurality of battery blocks by dividing the full capacity of the battery into at least two, if a first input operation is entered when the first image is displayed to provide a battery blocks set up.

The calculation module calculates a capacity ratio based on capacity of each of the battery blocks and the full capacity, and a remaining battery block capacity of each of the battery blocks based on the capacity ratio. The function allocation module allocates at least one function to at least one of the battery blocks. The processor causes the display module to display a plurality of second images indicating the capacity ratio and the remaining battery block capacity of corresponding battery block, and display the function allocated to one of the battery blocks for one of the second images, when the battery blocks are set.

In an embodiment, a method for operating mobile electronic device receives an input operation by a user, stores functions, and measures a remaining battery capacity of a battery. The method further displays a first image indicating the remaining battery capacity and full capacity of the battery. The method further sets a plurality of battery blocks by dividing the full capacity of the battery into at least two, if a first input operation is entered when the first image is displayed, to provide a battery blocks set up. The method further calculates a capacity ratio based on capacity of each of the battery blocks and the full capacity, and calculating a remaining battery block capacity of each of the battery blocks based on the capacity ratio. The method further allocates at least one function to at least one of the battery blocks, and displays a plurality of second images indicating the capacity ratio and the remaining battery block capacity. The method further displays the function allocated to one of the battery blocks for one of the second images, when the battery blocks are set.

In a further embodiment, a non-transitory computer readable storage medium comprises computer-executable instructions for operating a mobile electronic device. The method executed by the computer-executable instructions receives an input operation by a user, stores functions, and measures a remaining battery capacity of a battery. The method executed by the computer-executable instructions further displays a first image indicating the remaining battery capacity and full capacity of the battery. The method executed by the computer-executable instructions further sets battery blocks by dividing the full capacity of the battery into at least two, if a first input operation is entered when the first image is displayed, to provide a battery blocks set up.

The method executed by the computer-executable instructions further calculates a capacity ratio based on capacity of each of the battery blocks and the full capacity, and calculates a remaining battery block capacity of each of the battery blocks based on the capacity ratio. The method executed by the computer-executable instructions further allocates at least one function to at least one of the battery blocks, and displaying a plurality of second images indicating the capacity ratio and the remaining battery block capacity in place of the battery image. The method executed by the computer-executable instructions further displays the function allocated to one of the battery blocks for one of the second images, when the battery blocks are set.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 4 is an illustration of an exemplary configuration of functional group data stored in a Random Access Memory (RAM) shown in FIG. 1.

FIGS. 6A and 6B are illustrations of an exemplary configuration of battery setting data stored in a Random Access Memory (RAM) shown in FIG. 1.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, iPod™, iPad™, display monitors, or other electronic device that uses a display screen or a touch panel for displaying information and comprises a battery.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
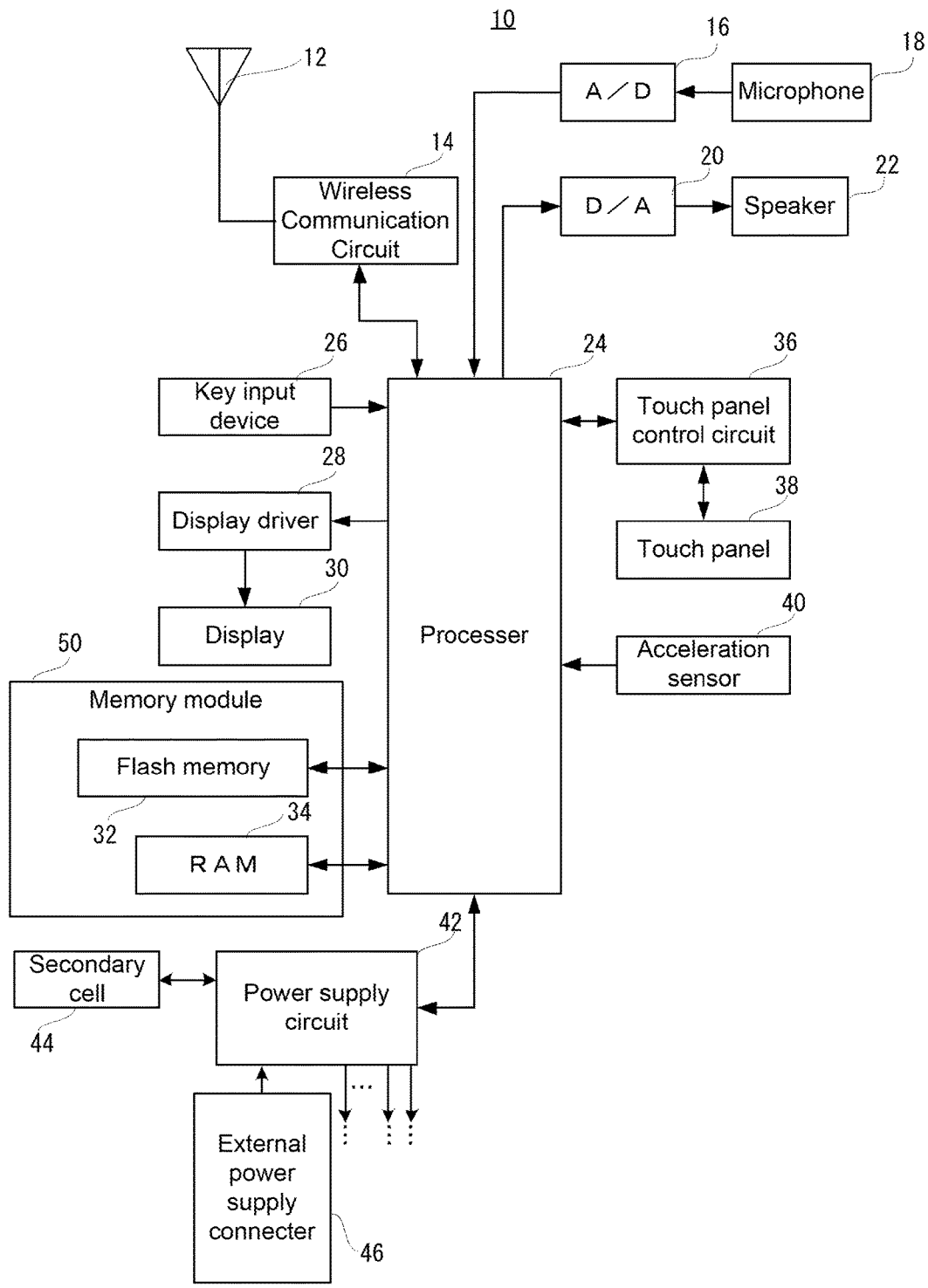
FIG. 1 is an illustration of a schematic block diagram of a mobile phone according to an embodiment of the disclosure.

FIG. 1 is an illustration of a schematic block diagram of a mobile phone 10 according to an embodiment of the disclosure. As shown in FIG. 1, the mobile phone 10 according to the present embodiment may comprise a processor 24 comprising a computer or a CPU. The processor 24 is coupled to a wireless communication circuit 14, an A/D converter 16, a D/A converter 20, a key input device 26, a display driver 28, a memory module 50, a touch panel control circuit 36, an acceleration sensor 40, and a power supply circuit 42.

The wireless communication circuit 14 is coupled to an antenna 12. The A/D converter 16 is coupled to a microphone 18. The D/A converter 20 is coupled to a speaker 22. The display driver 28 is coupled to a display 30. The touch panel control circuit 36 is also coupled to a touch panel 38. The power supply circuit 42 is coupled to a secondary cell 44 and an external power supply connecter 46.

The processor 24 is capable of controlling functions of the mobile phone 10. The processor 24 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 50 may be any suitable data storage area with suitable amount of memory that is formatted to support the operation of the mobile phone 10. Memory module 50 is configured to store, maintain, and provide data as needed to support the functionality of the mobile phone 10 in the manner described below. In practical embodiments, the memory module 50 may comprise, for example but without limitation, a non-volatile storage device (non-volatile semiconductor memory, hard disk device, optical disk device, and the like), a random access storage device (for example, SRAM, DRAM), or any other form of storage medium known in the art.

For example the memory module 50, may comprise a RAM 34 and a flash memory 32. The RAM 34 is used as a work area (including a drawing area) or as a buffer area for the processor 24. A flash memory 32 stores content data of the mobile phone 10, such as but without limitation, characters, letters, images, audios, sounds, movies, or other content data. The memory module 50 may be coupled to the processor 24 and configured to store, for example but without limitation, a battery capacity, a remaining battery capacity, or other data.

The A/D converter 16 converts analog audio signals of audios or sounds input through the microphone 18 to digital audio signals. The D/A converter 20 converts (decodes) the digital audio signals to analog audio signals and provides the converted analog signals to the speaker 22 through an amplifier not shown in Figures. The audios or sounds corresponding to the analog audio signals are output from the speaker 22. The processor 24 is capable of adjusting volume of the audio output from the speaker 22 by controlling an amplification factor of an amplifier.

The key input device 26 comprises a home key for returning to a standby state, a call key, and an end-call key. The data of key (the key data) operated by a user is output to the processor 24. Operating each key comprises in the key input device 26 makes a click sound. By hearing the click sound, a user is able to recognize the key is operated.

The display driver 28 controls a display on the display 30 coupled to the display driver 28 according to the instruction from the processor 24. The display driver 28 also comprises a video memory (not shown) for temporarily storing video data to be displayed.

The display 30 is configured to display various kinds of information via an image/video signal supplied from the processor 24. The display 30 may accept a user input operation to input and transmit data, and input operation commands for functions provided in the mobile phone 10. The display 30 accepts the operation command, and outputs operation command information to the processor 24 in response to the accepted operation command. The display 30 may be formed by, for example but without limitation, an organic electro-luminescence (OEL) panel, liquid crystal panel (LCD), and the like.

The touch panel 38 employs a system of capacitance, which detects changes of capacitance between electrodes caused by approximation of an object, such as a finger, to the surface; for example, the system may detect that one or more fingers touch the touch panel 38. The touch panel 38 is arranged on top of the display 30 and used as a pointing device for a user to specify an arbitrary location within the screen of the display 30. The touch panel control circuit 36 (detection module), detects various types of touch operations such as but without limitation, pressing, stroking, and touching, within the touch effective area of the touch panel 38 and outputs the coordinate data of the detected location of the touch operation to the processor 24. That is, a user may input a direction of operation or graphic to the mobile phone 10 by pressing, stroking, and touching the surface of the touch panel 38 with a finger or the like.

An operation of a user touching on a top surface of the touch panel 38 with a finger is referred to as a "touch." By contrast, an operation of releasing a finger from the touch panel 38 is referred to as a "release." An operation of a user touching and then releasing from the top surface of the touch panel 38 is referred to as a "touch and release."

An operation of stroking the surface of the touch panel 38 is referred to as a "slide" and an operation of touching, sliding and then releasing is referred to as a "touch-slide." Furthermore, an operation of touching and releasing continuously twice is referred to as a "double-tap," and an operation of touching more than two locations almost simultaneously is referred to as a "multi-touch." The "touch operation" includes the above "touch" "release," "touch and release," "slide," "touch-slide," "double-tap," "multi-touch," and the like.

Furthermore, a coordinate identified by a touch is referred to as a "touched point" (a starting location of a touch," and a coordinate identified by a release is referred to as a "released point" (a finishing location of a touch).

In addition, a touch operation may be performed not only by a finger but also by other objects, such as but without limitation, a touch pen, or other objects comprising a conductive material on a nib. The detecting system for the touch panel 38 may comprise, for example but without limitation, a capacitance system, a resistive system, an ultrasonic system, an infrared system, an electromagnetic induction system, or other system.

The acceleration sensor 40 comprises a semiconductor triaxial acceleration sensor, and it outputs triaxial acceleration data (X, Y, and Z) with respect to the mobile phone 10 to the processor 24. The processor 24 applies an inverse trigonometric function to a value indicated by the triaxial acceleration data and calculates the angle of the inclination of the mobile phone 10. For this reason, the acceleration sensor 40 is used as an inclination sensor detecting the inclination of the position of the mobile phone 10.

The touch panel control circuit 36, the touch panel 38, and the acceleration sensor 40 receive an instinctive input operation with respect to the mobile phone 10 from a user and may be called an input module. Thus, the mobile phone 10 may detect touch operations and the other operations, such as a tilt operation tilting the mobile phone 10 or a shake operation shaking the mobile phone 10, as input operations.

The power supply circuit 42 comprises an integrated circuit (IC) for power management, which comprises functions such as a measuring module and a charging module. The power supply circuit 42 is coupled to the secondary cell 44 of power supply such as a lithium-ion battery, and the external power supply connector 46. The power supply circuit 42 also measures and outputs the remaining battery capacity of the secondary cell 44 to the processor 24. The power supply circuit 42 provides power based on the voltage of the secondary cell 44 to the entire system. When the power supply circuit 42 provides power to the entire mobile phone 10 (system 10), the condition is referred to as a "power-on state."

By contrast, when the power supply circuit 42 does not provide power to the entire system 10, the condition is referred to as a "power-off state." However, power is always provided to the processor 24 even in a power-off state, because it is necessary to receive key data from the key input device 26. The power supply circuit 42 is switched to a power-on state when the key input device 26 performs a power-on operation in a power-off state and is switched to a power-off state when the key input device 26 performs a power-off operation in a power-on state. The power supply circuit 42 starts up when the external power supply connector 46 is coupled to an external power source and when power is provided (charged) to the secondary cell 44 in a power-off state. The power supply circuit 42 shuts down when detecting the secondary cell 44 is fully charged.

In the present embodiment, a lithium-ion battery is used as the secondary cell 44, but without limitation, a lead-storage battery, nickel-hydride battery, sodium-ion battery, metal-air battery, zinc bromide battery, or other batteries may be used. Furthermore, a primary cell may also be used in place of the secondary cell 44.

The external power supply connector 46 is coupled to an external power source converted from alternating-current power source, such as an AC adapter, or to an external power source converted from direct-current power source, such as a DC adapter. The external power supply connecter 46 may be coupled to an external power source through a USB cable or the like.

In this document, "charging" means that the secondary cell 44 stores electric energy as a result of electric power provided from an external power source to the secondary cell 44. Then the processor 24 detects the full charge condition based on a value of current measured by the power supply circuit 42.

The wireless communication circuit 14 is operable to transmit and receive a plurality of communication signals comprising data signals via a base station. The wireless communication circuit 14 communicates with the wireless network via a wireless data communication link (not shown). The wireless communication circuit 14 cooperates with a base station transceiver (not shown) with a suitably configured RF antenna arrangement 12 (antenna 12) that can support a particular wireless communication protocol and modulation scheme to transmit and receive the data signals form and to the processor 24.

The wireless communication protocol and modulation scheme may comprise, for example but without limitation, Code Division Multiple access (CDMA), Third Generation Partnership Project Long Term Evolution (3GPP LTE)™, Third Generation Partnership Project 2 Ultra Mobile Broadband (3Gpp2 UMB)™, Time Division-Synchronous Code Division Multiple Access (TD-SCDMA) TM, Wireless Interoperability for Microwave Access (WiMAX), or other wireless communication protocol and modulation scheme.

For example, in operation, when a user gives an instruction to place a call using the key input device 26, the wireless communication circuit 14 performs an outgoing call process and outputs outgoing-call signals through the antenna 12 according to the instruction of the processor 24. The outgoing-call signals are transmitted to a telephone set at a call receiver side (callee) through base stations and communication networks (not shown). When the telephone set at the call receiver side performs the incoming-call process, the communication becomes available, and the processor 24 performs a call process (telephonic communication process).

A call process is described below. The antenna 12 receives modulated audio signals transmitted from a telephone set at the other side. The wireless communication circuit 14 performs demodulation and decoding processes on the received modulated audio signals. The wireless communication circuit 14 outputs the modulated audio signals on which the demodulation and decoding processes are performed as received audio signals. The received audio signals are converted to analog audio signals by the D/A converter 20 and output from the speaker 22.

Transmitted audio signals taken in through the microphone 18 are converted to digital audio signals by the A/D converter 16 and output to the processer 24. Based on the instruction of the processor 24, the wireless communication circuit 14 performs encoding and modulation processes on the digital audio signals. The digital audio signals on which the encoding and modulation processes are performed are output through the antenna 12. Thus, the modulation audio signals are transmitted to the telephone set at the other side through base stations and communication networks.

When the antenna 12 receives outgoing-call signals transmitted from a telephone set at the other side, the wireless communication circuit 14 notifies to the processor 24 that a call (an incoming call) is received. The processor 24 controls the display driver 28 and causes the display 30 to display the originator's information (such as a telephone number) included in the outgoing-call signals. The processor 24 also causes to output a ring tone (alternatively called a ringer melody or incoming call sound) from a speaker (not shown) and to spin a motor of a vibrator (not shown).

When a user performs a reply operation to an incoming call using a call key, the wireless communication circuit 14 performs a receiving-a-call process based on the instruction of the processor 24. After the receiving-a-call process is performed, communication becomes available. The processor 24 performs the above-mentioned call process once communication becomes available.

When a user performs an end-call operation by operating an end-call key after communication becomes available, the processor 24 controls the wireless communication circuit 14 and transmits end-call signals to the other party. Then the processor 24 terminates the call process after transmitting the end-call signals. The processor 24 also terminates the call process when receiving end-call signals from the other party. The processor 24 also terminates the call process when receiving end-call signals not from the other party, but from a mobile communication network. In addition, an outgoing-call process and/or a call process are referred to as a phone function.

The mobile phone 10 is capable of performing a browsing function that a user performs to browse data stored in a server and other functions. Furthermore, a user may add arbitrary functions (applications), such as a music player for listening to music, by establishing communications with a server through networks.

Figure 2:
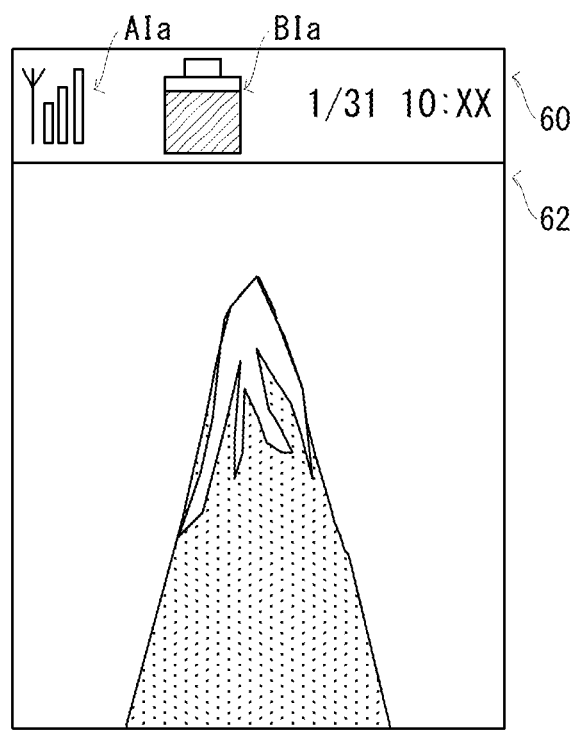
FIG. 2 is an illustration of an exemplary standby screen displayed on a display shown in FIG. 1.

FIG. 2 is an illustration showing an exemplary display of the display 30 in the standby condition. The display of the display 30 comprises an antenna icon AIa indicating the reception condition by the antenna 12, a battery icon BIa indicating a remaining battery capacity to the full capacity of the secondary cell 44, a condition display area 60 showing time and date, and a function display area 62, in which a standby screen is displayed. The antenna icon AIa and the battery icon BIa displayed in the condition display area 60 respectively have other kinds. When there is no need to distinguish a kind of an antenna icon, it is simply referred to as an "antenna icon AI." When there is no need to distinguish a kind of a battery icon, it is simply called a "battery icon BI."

Figure 3A:
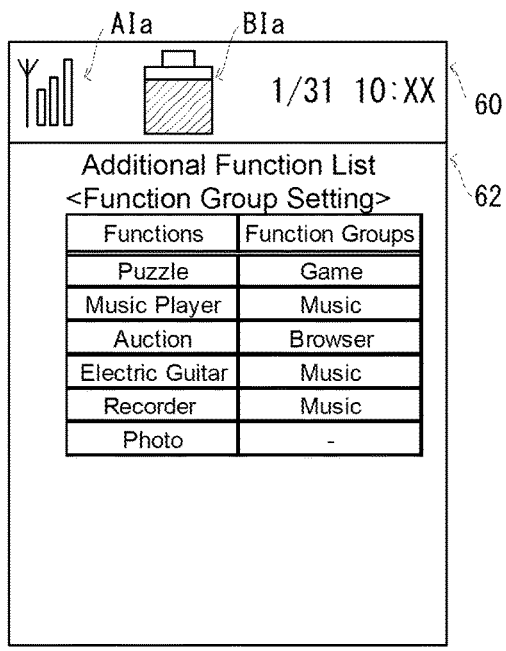
FIGS. 3A to 3C are illustrations of an exemplary settings screen displayed on the display shown in FIG. 1.

As shown in FIG. 3A, when the battery icon BIa is touched longer than a predefined time (a touch of pressing long), the setting screen is displayed on the display 30. The setting screen comprises an additional function list. The additional function list comprises a column entitled "functions" where functions added by a user are displayed and a column entitled "function groups" where function groups for classifying the added functions are displayed. In the column of "functions," the followings are displayed as examples of the functions added by a user: a "puzzle" indicating a function of a puzzle game, a "music player" indicating a function of playing and managing music data, an "auction" indicating a function of assisting use of an auction site, an "electronic guitar" indicating a function of electronic instruments, a "recorder" indication a function of recording surrounding audios/sounds, and a "photo" indicating a function of managing image data by uploading to a server.

Furthermore, in the column of the "function groups," function groups of a "call," "browser," and "music" are displayed as examples. The "call" is a function group for classifying functions of exchanging audios/sounds, such as a phone function. The "browser" is a function group for classifying communication functions between servers through networks. The "music" is a function group for classifying functions of playing and recording of audios/sounds.

In the additional function list shown in FIG. 3A, the function of the "puzzle" is associated with the function group, "game"; the function of the "music player" is associated with the function group, the "music"; the function of the "auction" is associated with the function group, the "browser"; and the functions of a "electronic guitar" and a "recorder" are associated with the function group, the "music." In FIG. 3A, no function group is set for the function of a "photo." When a user touches a field where no function group is set, the user may set the function group for the corresponding function (the function of the "photo" in FIG. 3A).

Figure 3B:
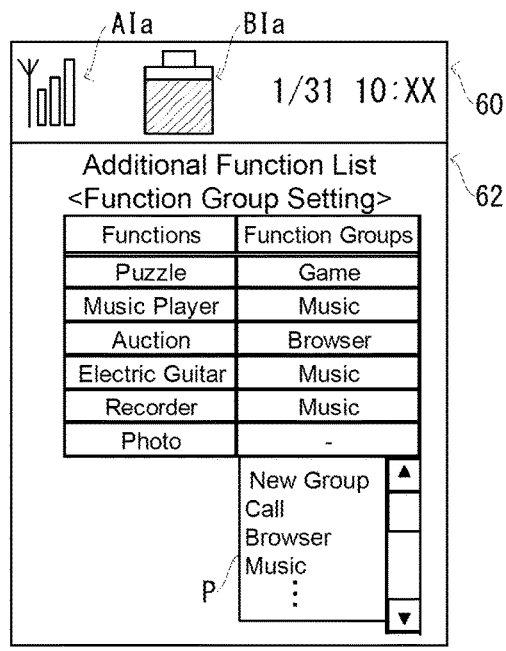
Figure 3C:
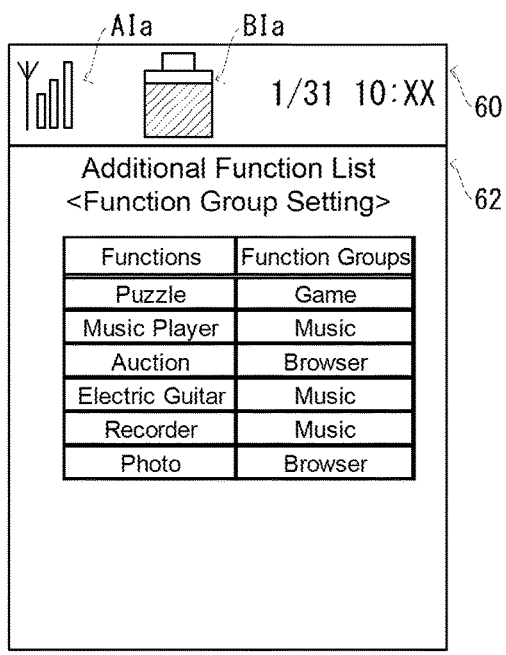

As shown in FIG. 3B, when a touch operation is performed to the field in the column of the function group, in the row of the "photo," a pull-down menu P for selecting a function group is displayed. If the function group, "browser," is touched among the function groups shown in the pull-down menu P, the function, "photo," is associated with the function group, "browser," as shown in FIG. 3C.

When a touch operation is performed on the "new group," a new entry process for recording a new function group is performed. When the new entry process is performed, a graphic user Interface (GUI) for recording a name of a function group is displayed. If a touch operation is performed on the field where a function group has already been set, the function group may be reset.

When a function group is set, function group data stored in the RAM 34 is updated. As shown in FIG. 4, the function group data comprises a column recording names of function groups, a column recording consumed current, and a column recording classified functions. For example, the consumed current of the function group, the "call," is "XXX," and the call function group comprises a "phone function" as a classified function. The consumed current of the function group, the "browser," is "YYY," and the browser function group comprises "browsing," "auction," and "photo" functions as a classified function.

The function group, the "music," comprises a "music player," an "electronic guitar," and a "recorder" as a classified function; however, these classified functions are newly added by a user, and therefore, no consumed current is set up at this point. The consumed current of the function group, the "music," is set up when the function of the "music player," "electronic guitar," or "recorder" is performed. For example, when the music player is executed, a value of the consumed current is measured, and the measured result is set up as the consumed current of the "music."

Thus, a user may freely configure a function group even with a function added arbitrarily. The value of the consumed current for a newly added function group is measured when a classified function is executed, and the measured result is automatically set up. For this reason, the mobile phone 10 may find the estimated time described below, even for an added function.

In addition, a user may arbitrarily set up consumed current. The following explanation is based on the premise that the consumed current of the function group, the "music," is set up as "XXX."

Figure 5A:
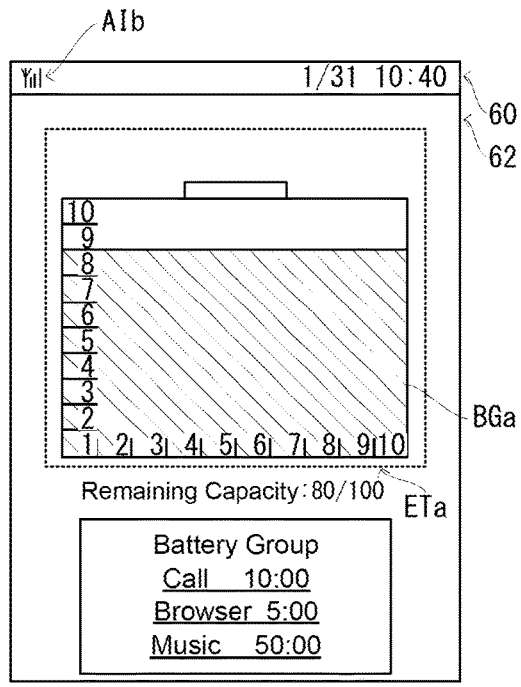
FIGS. 5A to 5D are illustrations of an exemplary detail screen displayed on the display shown in FIG. 1.

FIG. 5A shows that the detail screen is displayed on the display 30 when a double-tap to the battery icon BIa is performed. The antenna icon AIa is replaced with an antenna icon AIb in the condition display area 60 of the detail screen. Because the battery icon BIa is deleted, the condition display area 60 in FIG. 4 is smaller than the condition display area 60 in FIG. 3. A first battery image BGa and a battery group are also displayed in the function display area 62. The first battery image BGa indicates the remaining battery capacity to the full capacity of the secondary cell 44.

A graphic resembling a battery indicates the full capacity in the first battery image BGa. The area shaded with diagonal lines indicates the remaining battery capacity. In FIG. 5A, when the full capacity is set to "100," the remaining battery capacity is indicated as "80." Furthermore, a touch-operation effective area ETa is provided to the first battery image BGa, as described hereinafter. Hereinafter, when a battery image is not distinguished, it is simply described as the "battery image BG." Also battery image and battery block image may be used interchangeably herein.

A battery group shown below the battery image BG comprises at least one or more function groups. The battery group is associated with the battery image BG. Each function group in the battery group is associated with an estimated time. The estimated time is the time when a function in the function group may be used. The estimated time is calculated based on the remaining battery capacity and the consumed current recorded in the function group data. For example, when the remaining battery capacity is "80," the estimated time is "10:00" for the call, "5:00" for the browser, and "50:00" for the music. A user may use the estimated time as a reference and create a utilization plan of the mobile phone 10.

Even if a user creates a utilization plan, it may be difficult to use the mobile phone 10 in such a way as to leave certain remaining battery capacity. In an embodiment, by a touch operation, a plurality of battery blocks are set up by dividing the full capacity of the secondary cell 44, and a battery group including an arbitrary function group may be allocated to at least one battery block. Thus, a user may allocate a battery block to a function (function group) mainly used and may use the function without worrying about the remaining battery capacity.

Figure 5B:
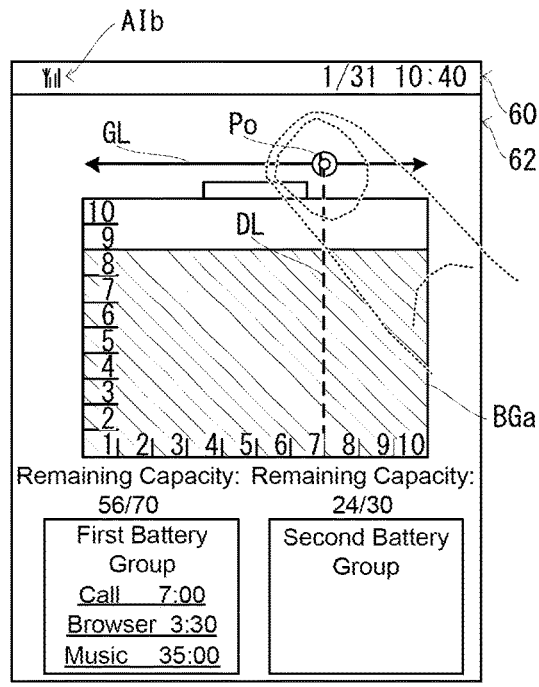

As shown in FIG. 5B, when a touch operation is performed in the effective area ETa, an auxiliary line GL, both ends of which are arrows, and a parting line DL indicated as a dashed line are displayed to correspond with the first battery image BGa. A pointer Po is displayed at the intersection point of the auxiliary line GL and the paring line DL and the location touched by a finger.

The pointer Po may be moved on the auxiliary line GL right and left. The parting line DL is a line for dividing the first battery image BGa to right and left. The parting line DL preliminarily indicates the ratio of the battery block to be divided. In the following description, the left side of the parting line DL on the first battery image BGa is referred to as a first virtual battery block, and the right side as a second virtual battery block.

The displayed location of the pointer Po and the parting line DL changes as the pointer Po moves (as the touched location moves). A user may change the ratio between the first virtual battery block and the second virtual battery block by sliding a finger along the auxiliary line GL. Furthermore, when a battery block is set up, the capacity ratio and the remaining battery block capacity are displayed to correspond with the first virtual battery block and the second virtual battery block.

The capacity ratio and the remaining battery block capacity are displayed under the battery image BG. The first battery group is displayed to correspond with the first virtual battery block, and the second battery group is displayed to correspond with the second virtual battery block. At this time, the first battery group takes over the function groups included in the original battery group while the second battery group does not include any function group.

In FIG. 5B, the parting line DL is displayed to intersect with a location of "7" in the first battery image BGa, and that enables to see that the full capacity of the secondary battery/cell 44 is divided into the first virtual battery block and the second virtual battery block in the ratio of "7:3." Furthermore, the "Remaining capacity: 56/70" displayed at the lower left side of the first battery image BGa corresponds to the first virtual battery block, and that enables to see that the remaining battery block capacity of the first virtual battery block is "56." On the other hand, "Remaining capacity: 24/30" displayed at the lower right side of the first battery image BGa corresponds to the second virtual battery block, and that enables to see that the remaining battery block capacity of the second virtual battery block is "24."

Thus, the remaining battery capacity is divided in the same ratio, in which the full capacity is divided. That is, if the original remaining battery capacity is 80 (80%), and if the dividing ratio is "7:3," the remaining battery block capacity of the first battery block is 56 (70%), and the remaining battery block capacity of the second battery block is 24 (30%).

The display of the first battery group is recalculated in conjunction with the remaining battery block capacity of the first virtual battery block. For this reason, when the remaining battery block capacity is "56," the estimated time for the call is changed from "10:00" to "7:00," the estimated time for the browser from "5:00" to "3:30," and the estimated time for the music from "50:00" to "35:00." Therefore, a user may perform a touch operation of moving a pointer to right and left by reference to the estimated time displayed for a battery group.

Figure 5C:
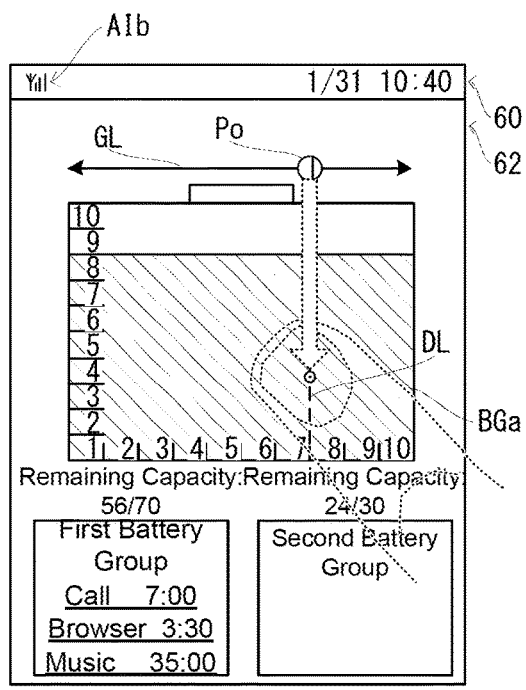
Figure 5D:
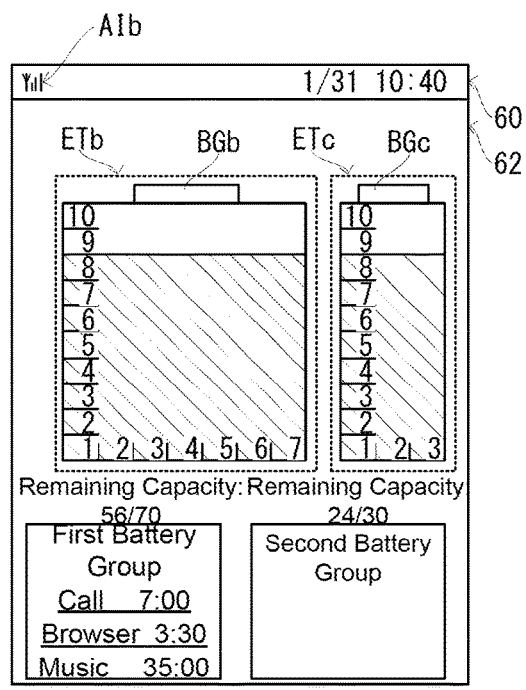

As shown in FIG. 5C, when a slide is performed in such a way as to trace the parting line DL, the ratio corresponding to the first virtual battery block and the second virtual battery block is determined, and the display is changed to one shown in FIG. 5D. That is, in place of the first battery image BGa, a second battery image BGb provided with an effective area ETb and a second battery image BGc provided with an effective area ETc are displayed.

As a result, a user may intuitively divide the full capacity of the secondary cell 44 by a touch operation. Setting up battery blocks accidentally is also prevented by combining touch operations of a touch and a slide. Furthermore, a user may use the second battery block that is not allocated to a function group as a backup remaining battery capacity. That is, in the subject embodiment, all battery blocks do not need to be allocated to a function group.

When a consumed current is not set for a function group, "-," indicating the estimated time may not be calculated, may be displayed in the column of the battery group. A value of the estimated time displayed as "-" is indicated after the consumed current value is set.

As shown in FIGS. 6A and 6B, the divided full capacity of the secondary cell 44 is stored in the RAM 34 as battery setting data. If a battery capacity block is not set up, the battery setting data is indicated as shown in FIG. 6A. When the battery capacity block is not set up, the battery setting data comprises a column for "Remaining battery capacity/Battery capacity" where "80/100" is recorded and a column for "Battery groups" where function groups, such as the "call, browser, and music" are recorded.

Next, when a battery block is set up, a column for "Battery blocks" is newly added to the battery setting data, and the column for "Remaining battery capacity/battery capacity" is replaced with one for "Remaining battery capacity block/capacity ratio." In a column entitled "Remaining battery block/capacity ratio", a row entitled "First battery block", "56/70" is recorded. In a column entitled the battery groups, the row entitled the first battery block, the function groups of "call, browser, and music" are recorded. In the column entitled "Remaining battery block/capacity ratio," a row entitled the "second battery block," "24/30" is recorded. However, as shown in FIG. 5D, if the second battery group does not include a function group, nothing is recorded in the field of "Battery groups."

When a function is executed in the mobile phone 10, the remaining battery capacity of the secondary cell 44 is managed based on the battery setting data. For example, when a phone function included in the function group, "Call," is executed, the remaining battery capacity is managed as "56."

The battery setting data is updated at a constant frequency. In the subject embodiment, electric power consumed in a standby condition is reflected in a remaining battery block capacity of the first battery block that is allocated to the function group of "Call." However, the power consumed in the standby condition may be reflected in the remaining battery block capacity of the second battery block that is not allocated to the function group, "Call," or in the remaining capacity of the both first and second battery blocks. The power consumed in a standby condition may be reflected in the battery block that has more capacity ratio. The power consumed in the standby condition may be also reflected in a battery block with more remaining battery block capacity.

Figure 7A:
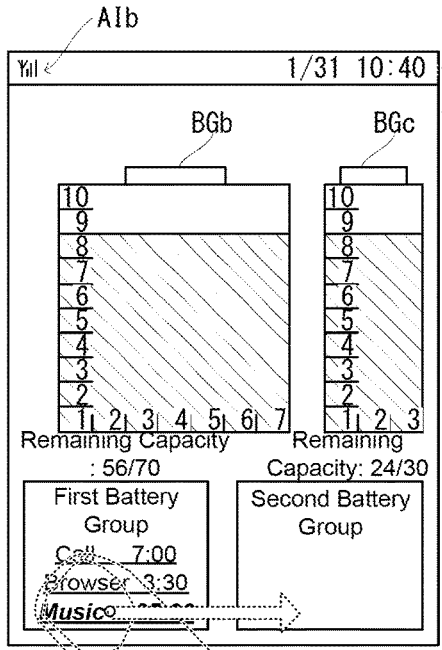
FIGS. 7A and 7B are illustrations of an exemplary detail screen displayed on the display shown in FIG. 1.
Figure 7B:
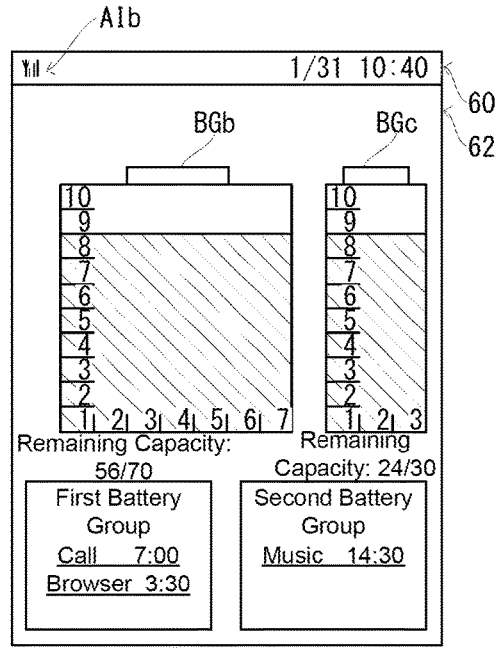

As shown in FIGS. 7A and 7B, a user may move a function group to an arbitrary battery block by a touch operation to the function group. For example, when the function group, the "music," is touched, the processor 24 highlights the display of the text indicating the function group of the music, that is, the text of "Music 35:00." When the processor 24 detects that the touched location enters the display area of the second group by a slide, it calculates the estimated time for the function group of the "music" based on the remaining battery block capacity of the second battery block and the consumed current of the "music" included in the function group data. The processor 24 also displays the function group of the "music" and the estimated time in the display area of the second battery group. When a release is detected in the display area of the second battery group, move of the highlighted function group from the first battery group to the second battery group is completed as shown in FIG. 7B.

Thus, a user may allocates an arbitrary function group to an arbitrary battery group by reference to the estimated time included in the second battery images BGb and BGc, and the battery groups. A user may also allocate a plurality of functions to a battery block as a whole and, therefore, may not need to perform a complex operation to allocate each function to a battery block.

Figure 8A:
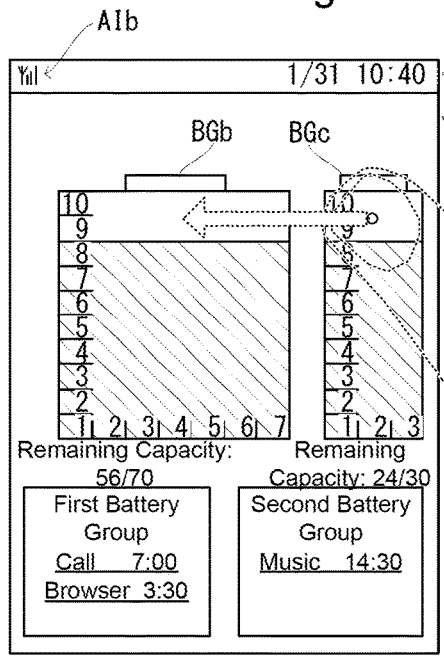
FIGS. 8A and 8B are illustrations of an exemplary detail screen displayed on the display shown in FIG. 1.
Figure 8B:
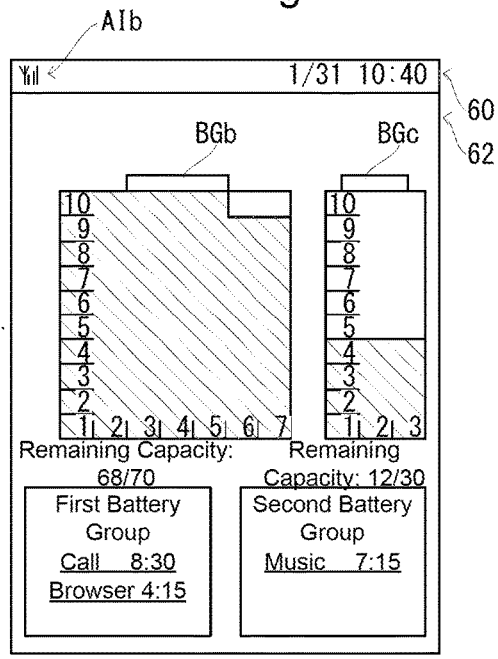

As shown in FIGS. 8A and 8B, a user may arbitrarily adjust the remaining battery block capacity of a battery block by performing a touch operation respectively to the second battery images BGb and BGc. For example, when detecting a touch to the second battery image BGc, and when detecting that the touched location slides into the display area of the first battery image BGb, the processor 24 calculates a quantity to be transferred per a given period of time (hereinafter, referred to as a transferred quantity) based on the slide distance of the touched location. The processer 24 moves at least a part of the remaining battery block capacity of the second battery block to the first battery block based on the touched period of time and the transferred quantity. That is, the remaining battery block capacity is moved from the second battery image BGc (the second battery block) to the second battery image BGb (the first battery block). A transferred quantity may be calculated based on a distance where a touched location slides per a given period of time.

The processor 24 terminates the transfer of the remaining battery block capacity when a release is detected. FIG. 8B shows the result of the transfer of the remaining battery block capacity. That is, the remaining battery block capacity of the first battery block is changed from "56" to "68," and the remaining battery block capacity of the second battery block is changed from "24" to "12." Furthermore, because the remaining battery block capacity is changed respectively, the estimated time for call in the first battery group is changed from "7:00" to "8:30," and the estimated time for Browser is changed from "4:30" to "4:15." The estimated time for the music in the second battery group is also changed from "14:30" to "7:15." However, the total quantity of the remaining battery block capacity is unchanged, although the remaining battery block capacity of each battery block is changed.

Thus, in an embodiment, the remaining battery block capacity of each battery block may be adjusted by a touch operation.

A transferred quantity is a quantity of a remaining battery block capacity that changes per a given period of time. The processor 24 calculates in such a way that longer a slide distance is, more the transferred quantity becomes. The second battery image BGb and the second battery image BGc may also be updated as the remaining battery block capacity changes. A user may know the change of the remaining battery block capacity in real time. The transferred quantity may be recalculated according to the change of the slide distance. Thus, a user may adjust the transferred quantity of the remaining battery block capacity by adjusting the slide distance.

Figures 9, 10:
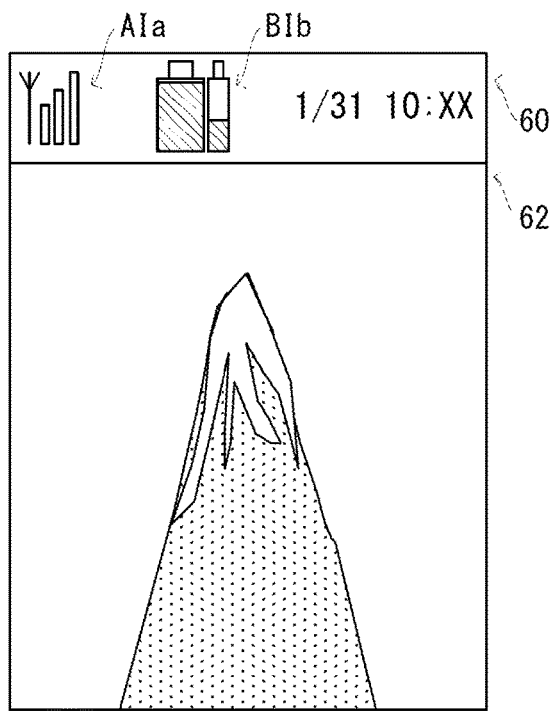
FIG. 9 is an illustration of an exemplary configuration of battery setting data stored in the Random Access Memory shown in FIG. 1.
FIG. 10 is an illustration of an exemplary standby screen displayed on the display shown in FIG. 1.

FIG. 9 indicates battery setting data in the condition of FIG. 8B. That is, "68/70" is recorded in a row entitled the first battery block, a column entitled "Remaining battery block capacity/capacity ratio," and the "call, and browser" are recorded in the row entitled the first battery block, a column entitled the "Battery groups." "12/30" is recorded in a row entitled "the second battery block," the column entitled the "Remaining battery block capacity/capacity ratio," and the "music" is recorded in the row entitled the second battery block, the column entitled the "Battery groups."

As shown in FIG. 10, when the processor 24 detects an operation on a home key in the condition of FIG. 8A, it causes the condition display area 60 to display the battery icon BIb indicating that the battery block is set up. Thus, a user may recognize that the battery block is set up by the new battery icon Bib.

Figure 11A:
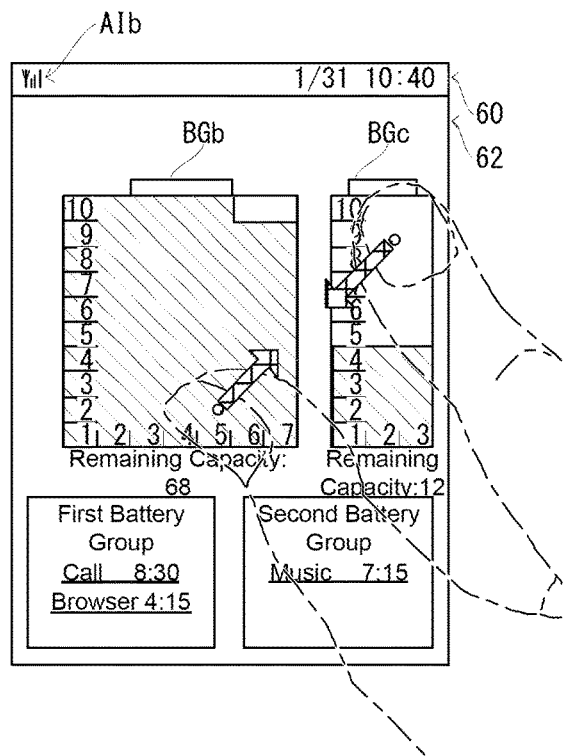
FIGS. 11A and 11B are illustrations of an exemplary detail screen displayed on the display shown in FIG. 1.
Figure 11B:
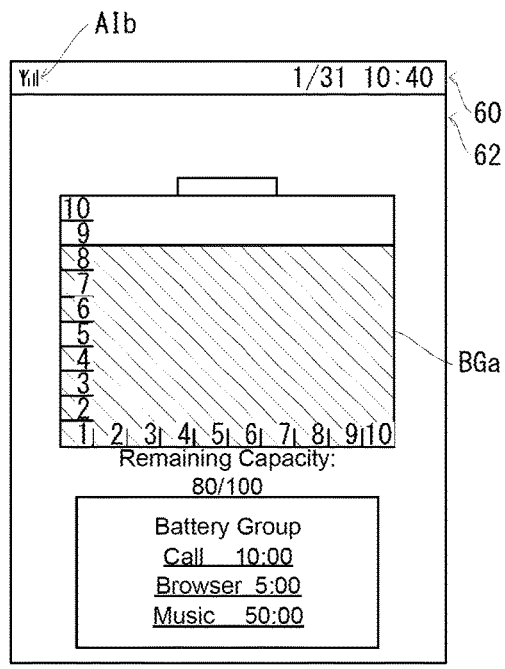

As shown in FIGS. 11A and 11B, when the processor 24 detects a touch operation on the both display areas of the second battery image BGb and the second battery image BGc, it deactivates the battery block setting. For example, when the processor 24 detects a touch on each display area of the first battery block and the second battery block, that is, when it detects a multi-touch, the processor 24 executes auxiliary display for prompting each touched point to approach. When two touched points slide to approach each other, the processor 24 deactivates the battery block setting. Specifically, a user touches respective display areas of the second battery image BGb and the second battery image BGc with a finger, and the user slide the two touching fingers to get closer.

That is, when the user slides two fingers in such a way as to pinch two battery blocks as a whole, the battery block setting is deactivated. As shown in FIG. 11B, the processor 24 displays the first battery image BGa, in place of the second battery images BGb and BGc, in the function display area 62 after the deactivation of the battery block setting. Hence, a user may deactivate a battery block setting by an intuitive operation.

Having confirmed the remaining battery capacity to the full capacity, a user may set up a battery block and allocate an arbitrary function to the battery block that is set up. A user may also allocate an arbitrarily added function to a battery block.

Figure 12:
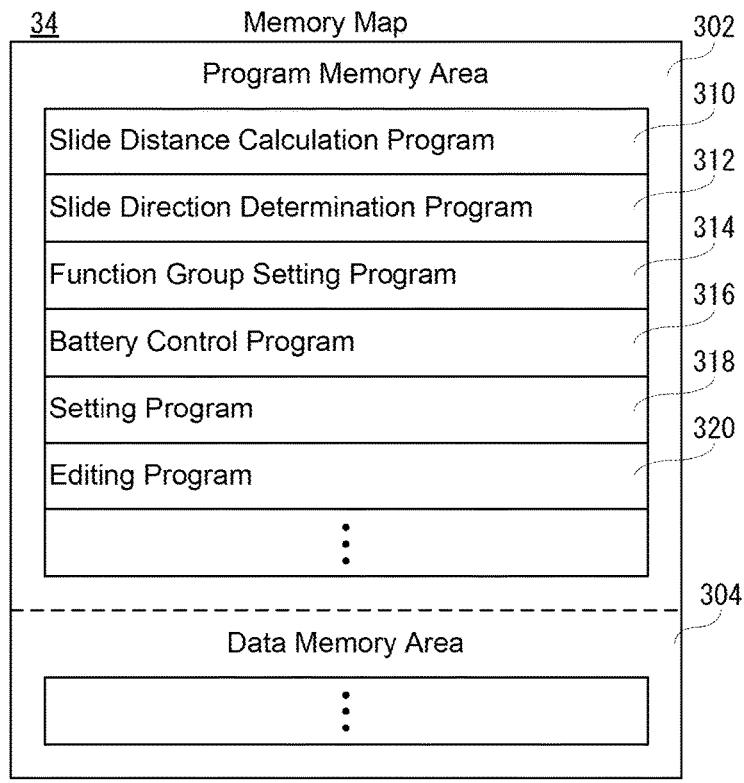
FIG. 12 is an illustration of an exemplary memory map of the Random Access Memory shown in FIG. 1.

FIG. 12 is an illustration showing a memory map of the RAM 34. The RAM 34 comprises a program memory area 302 and a data memory area 304. A part of a program or data is retrieved all at once or retrieved partially in series as necessary from the flash memory 32 and is stored in the RAM 34.

The program memory area 302 stores programs for operating the mobile phone 10. For example, the programs for operating the mobile phone 10 include a slide distance calculation program 310, a slide direction determination program 312, a function group setting program 314, a battery control program 316, a setting program 318, and an editing program 320. The processor 24 executes these programs and realizes functions.

The slide distance calculation program 310 is configured to calculate a distance from a touched point to a current touched location and for storing the calculated distance in a slide distance buffer 332. The slide direction determination program 312 is a program for determining whether a slide direction is vertical or horizontal based on an angle of the slide.

The function group setting program 314 is configured to set a function group to an added function. The battery control program 316 is configured to display a detail screen, comprising a battery image BG. The setting program 318 is configured to set a new battery block and edit a battery block. The editing program 320 is configured to adjust remaining battery block capacity of a battery block and to allocate a function group.

Although a figure is omitted, programs for operating the mobile phone 10 include a program for notifying of a condition of audio reception, a program for external communication, and other programs.

Figure 13:
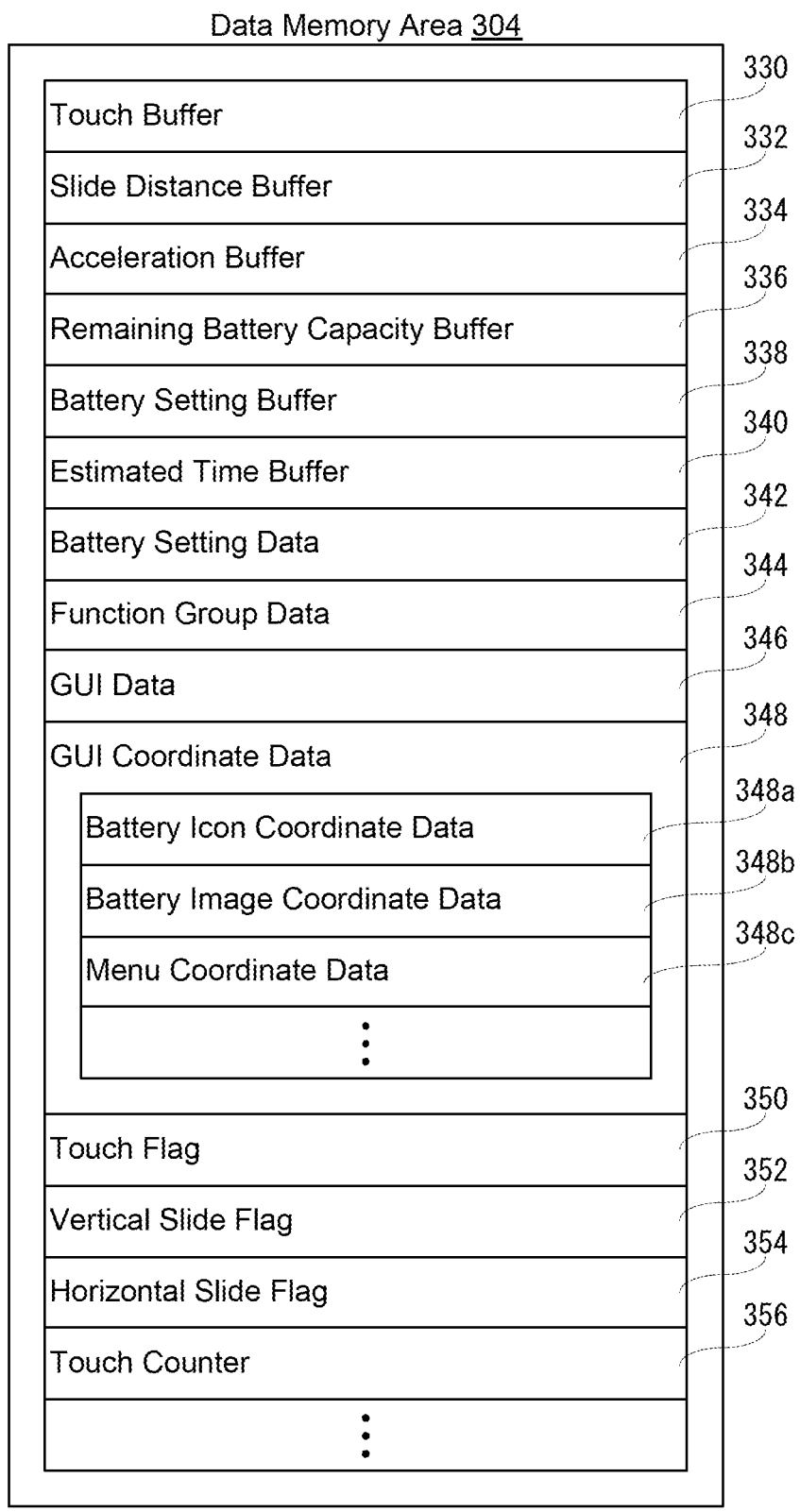
FIG. 13 is an illustration of an exemplary detail of a data storage area in a memory map shown in FIG. 12.

Referring to FIG. 13, a touch buffer 330, a slide distance buffer 332, a remaining battery capacity buffer 336, a battery setting buffer 338, an estimated time buffer 340, and other buffers are provided to the data memory area 304, and the data memory area 304 stores the battery setting data 342, the function group data 344, the GUI data 346, the GUI coordinate data 348 and other data. In the data memory area 304, a touch flag 350, a vertical slide flag 352, a horizontal slide flag 354, and a touch counter 356 are also provided.

The touch buffer 330 temporarily stores touch coordinate data, such as a touched point, a release point, a current touched location, obtained by a touch operation. The slide distance buffer 332 temporarily stores a slide distance calculated by the slide distance calculation program. An acceleration buffer 334 temporarily stores an acceleration data output by the acceleration sensor 40. The remaining battery capacity buffer 336 temporarily stores the remaining battery capacity of the secondary cell 44, calculated by the power supply circuit 42. The battery setting buffer 338 temporarily stores the capacity ratio, the remaining battery block capacity, and the battery groups when virtual battery blocks are set up. The estimated time buffer 340 temporarily stores a calculated estimated time.

The battery setting data 342 is the battery setting data shown in FIGS. 6A, 6B, and 9. The function group data 344 is the function group data shown in FIG. 4. The GUI data 346 is the data for displaying a menu, such as the antenna icon AI, the battery icon BI, the battery image BG, the battery groups and the like. The GUI coordinate data 348 is the data indicating the coordinate range of GUI displayed on the display 30 and comprises the battery icon coordinate data 348a, the battery image coordinate data 348b, the menu coordinate data 348c, and other data.

The battery icon coordinate data 348a is coordinate data indicating display ranges of the battery icon BIa and BIb displayed in the condition display area 60. The battery image coordinate data 348b is coordinate data indicating the display range and the effective area ETa of the first battery image BGa shown in FIG. 5A and the display range and the effective area ETb and ETc of the second battery images BGb and BGc shown in FIG. 5D. The menu coordinate data 348c indicates the battery groups shown in FIG. 5 (A), the display range of the first battery group and the second battery group shown in FIG. 5D.

The touch flag 350 determines if a touch operation is detected. For example, the touch flag 350 comprises one-bit register. When the touch flag 350 is on (satisfied), the value of data is set to "1" in the register. On the other hand, when the touch flag 350 is off (unsatisfied), the value of data is set to "0" in the register. When a touch operation is not detected, the touch flag 350 is set to be off, and when a touch operation is detected, the touch flag 350 is set to be on.

A vertical slide flag 352 indicates whether it is determined that a slide direction is in a vertical direction. If the slide direction is in a vertical direction, the vertical slide flag 352 is set to be on. A horizontal slide flag 354 is a flag indicating whether it is determined that a slide direction is in a horizontal direction. If the slide direction is in a horizontal direction, the horizontal slide flag 354 is set to be on. The touch counter 356 is a counter for measuring time when a touch operation is being performed.

Although a figure is omitted, the data memory area 304 stores data, such as table data for managing added functions, image data displayed in a standby condition, text data, and other data. A counter and a flag necessary for operation of the mobile phone 10 are also provided to the data memory area 304.

Figure 14:
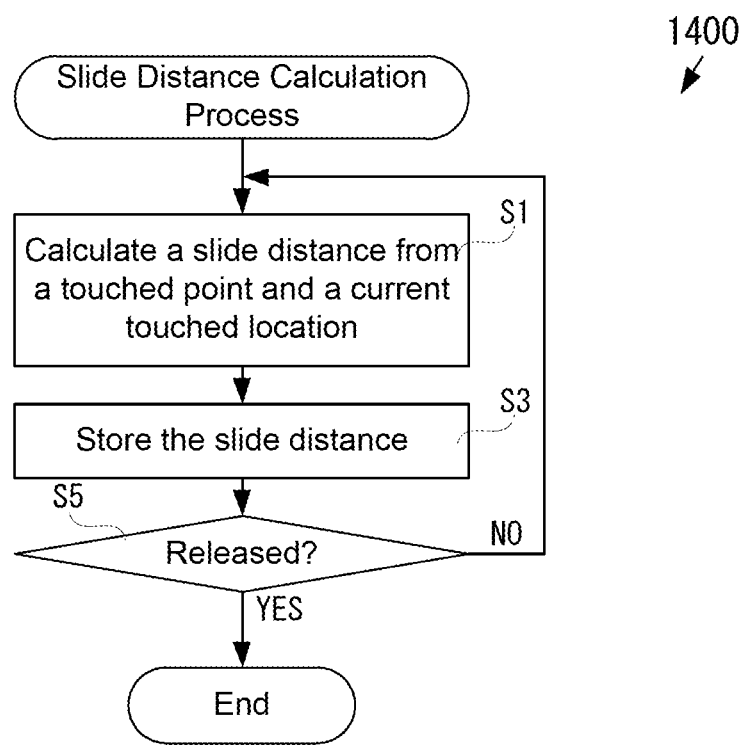
FIG. 14 is an illustration of a flow diagram showing an exemplary process for calculating a slide distance according to an embodiment of the disclosure.
Figure 15:
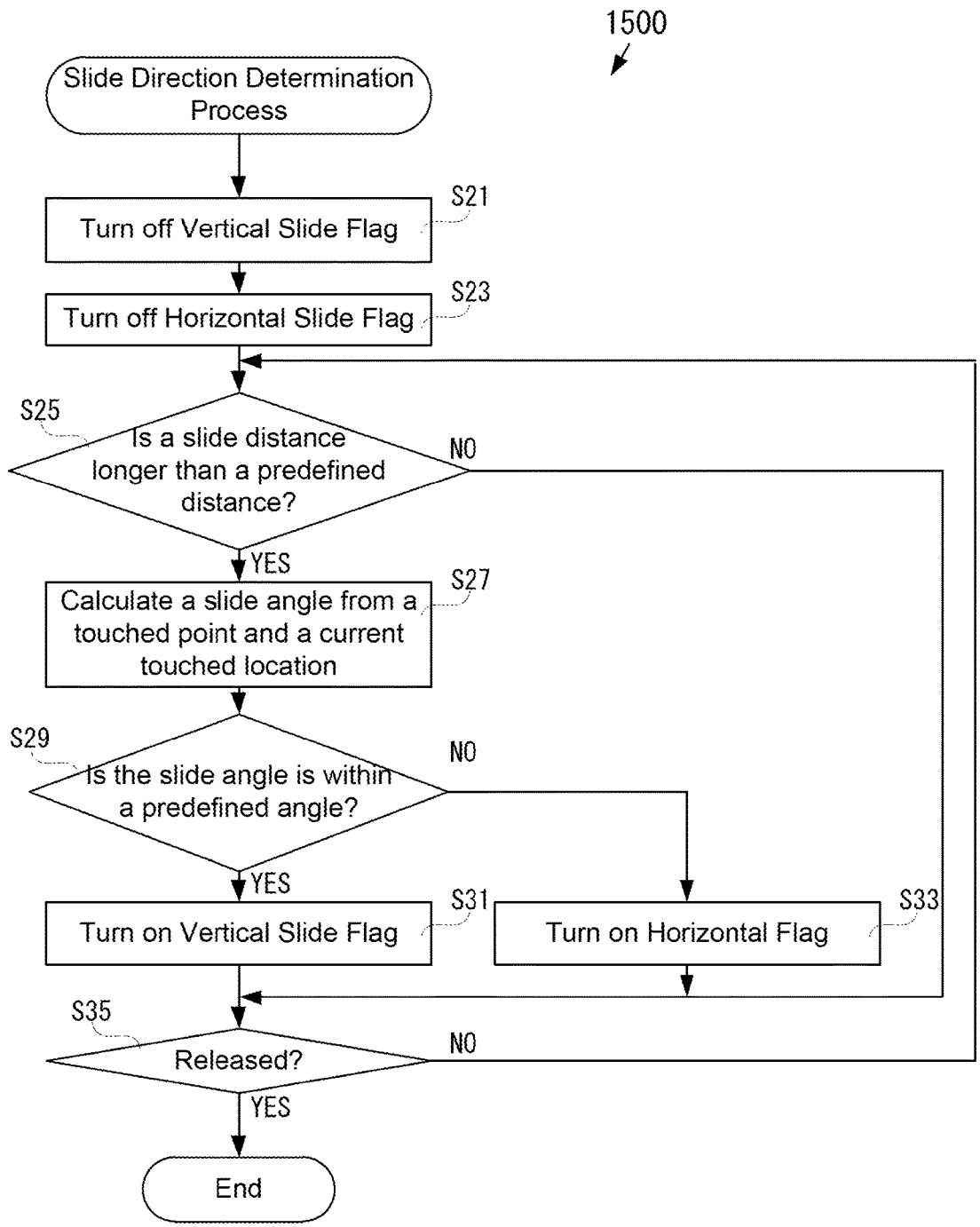
FIG. 15 is an illustration of a flow diagram showing an exemplary process for determining a slide direction according to an embodiment of the disclosure.
Figure 16:
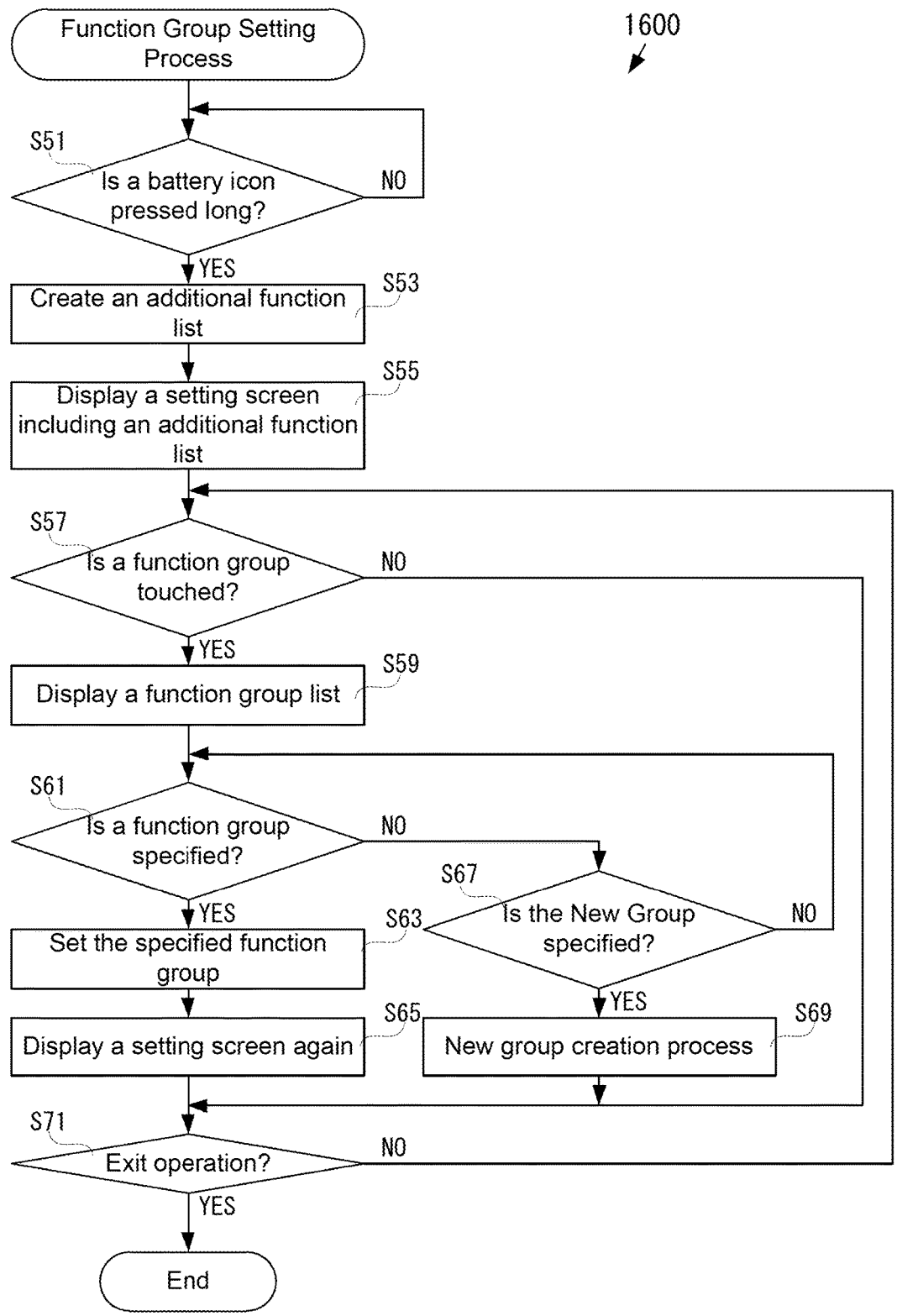
FIG. 16 is an illustration of a flow diagram showing an exemplary process for determining set up function groups according to an embodiment of the disclosure.
Figure 17:
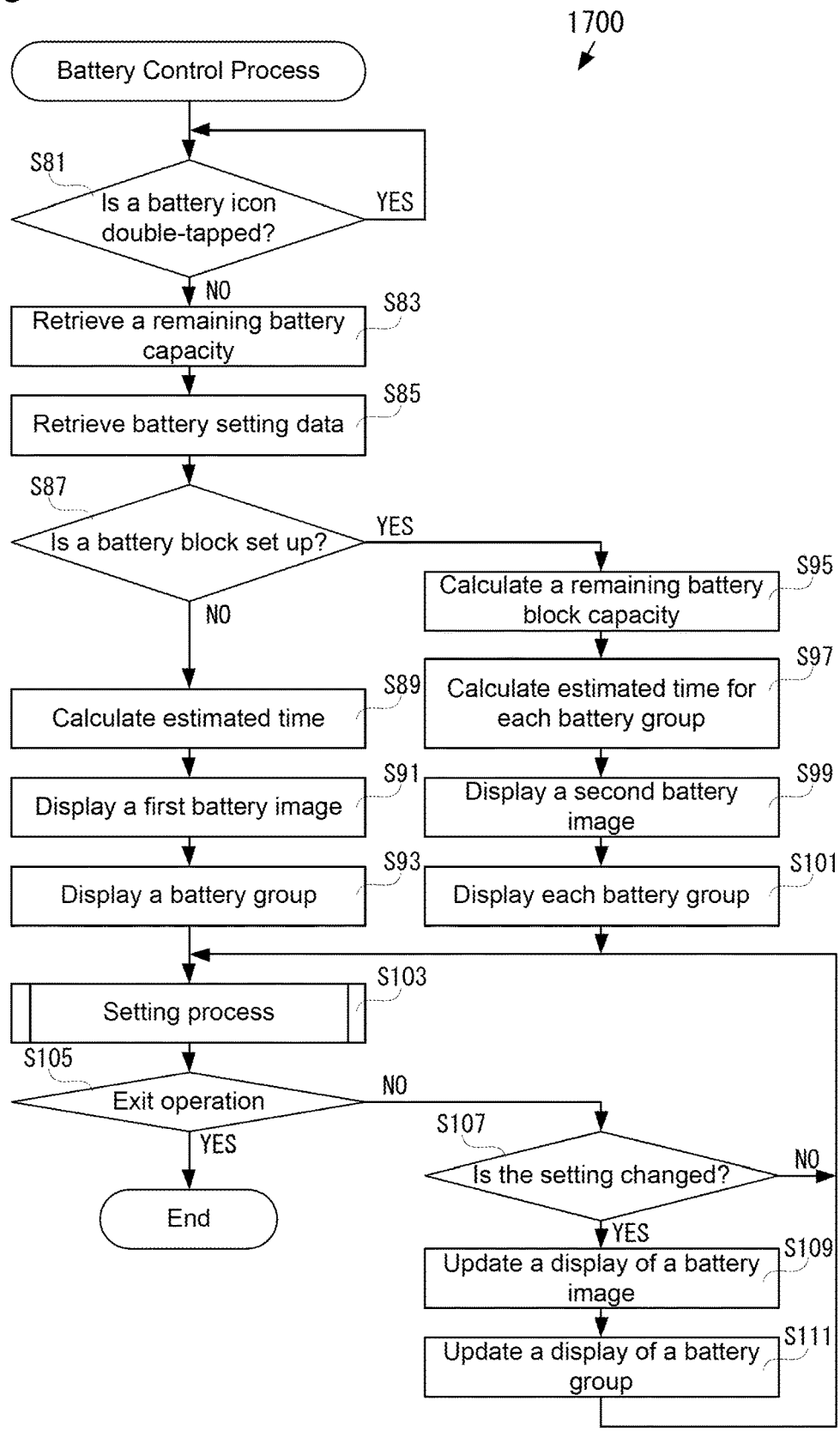
FIG. 17 is an illustration of a flow diagram showing an exemplary process for controlling a power supply according to an embodiment of the disclosure.
Figure 18:
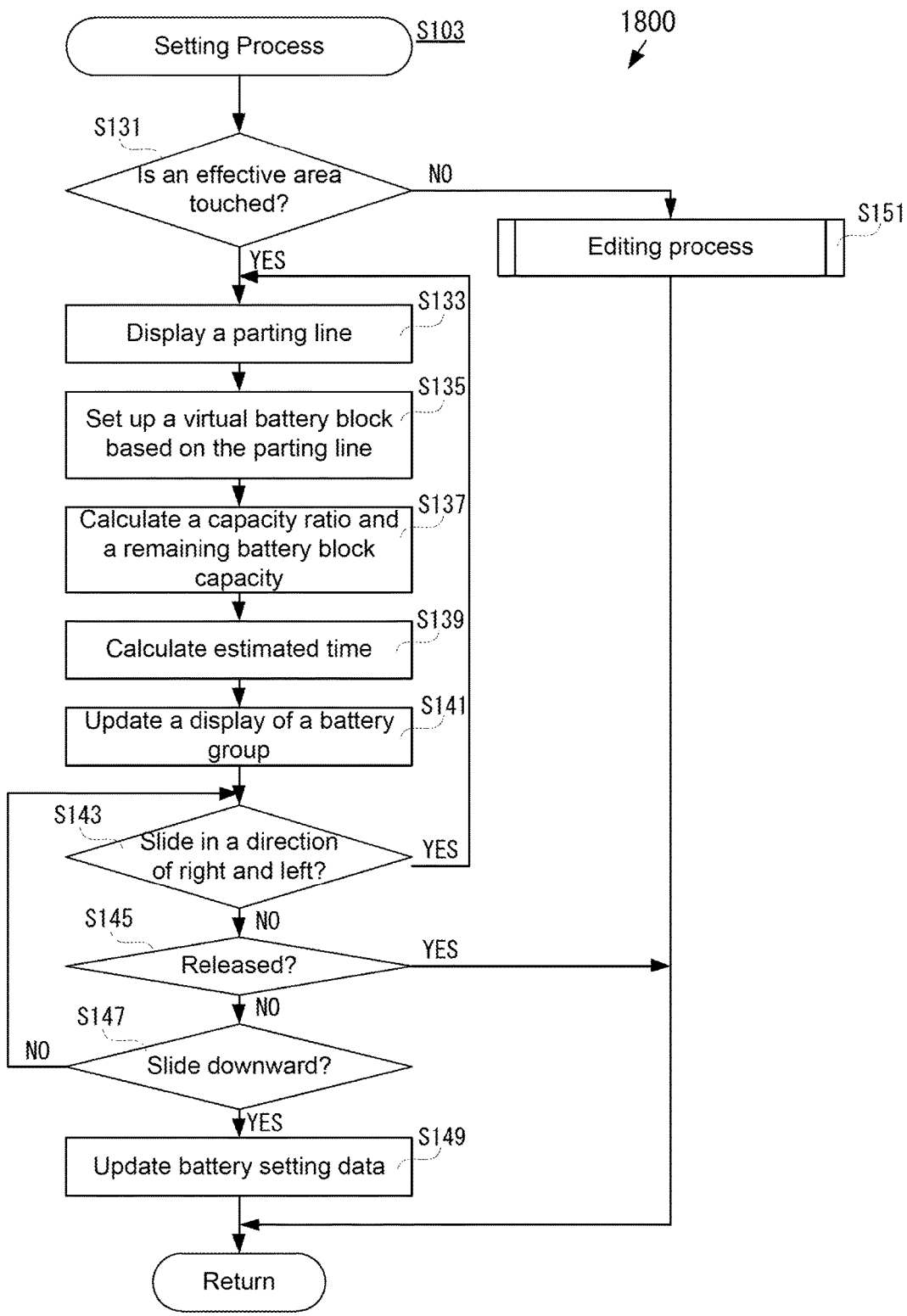
FIG. 18 is an illustration of a flow diagram showing an exemplary setting process according to an embodiment of the disclosure.
Figure 19:
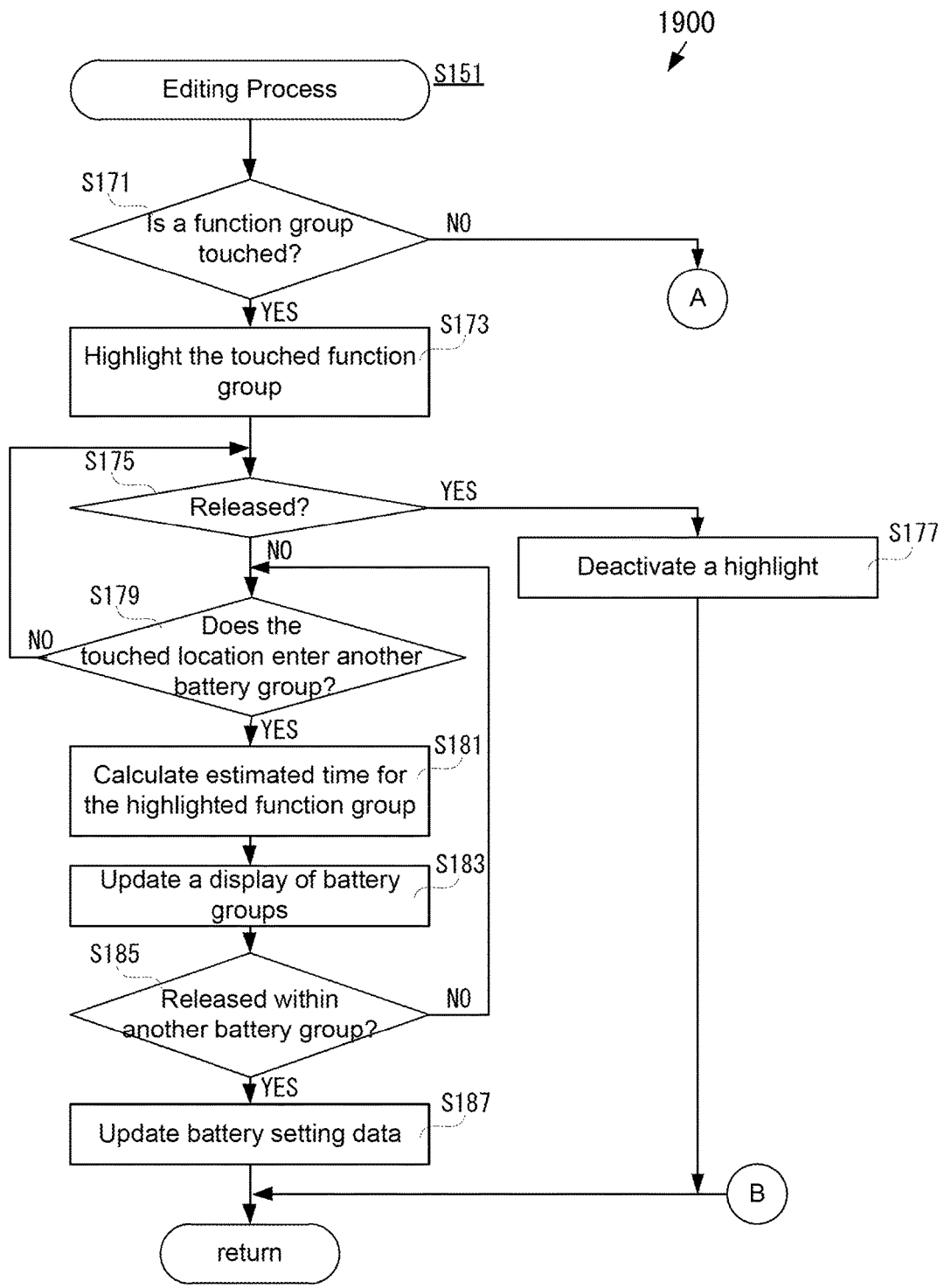
FIGS. 19-22 is an illustration of a flow diagram showing an exemplary editing process according to an embodiment of the disclosure.

The processor 24 may concurrently process a plurality of tasks including the slide distance calculation process shown in FIG. 14, the slide direction determination process shown in FIG. 15, the function group setting process shown in FIG. 16, the battery control process shown in FIG. 17, the setting process shown in FIG. 18, the editing process shown in FIGS. 19-22, and other processes, under control of an operating system (OS) based on, for example but without limitation, LINUX™, ANDROID™, Real-Time Executive Operating System (REX), or other operation system.

FIGS. 14-22 show various processes 1400-1900 that can be performed by the processor 24 for operating the mobile phone 10 according various embodiments of the disclosure. The various tasks performed in connection with the processes 1400-1900 may be performed by software, hardware, firmware, a computer-readable medium having computer executable instructions for performing the process method, or any combination thereof. The process 1400-1900 may be recorded in a computer-readable medium such as a semiconductor memory, a magnetic disk, an optical disk, and the like, and can be accessed and executed, for example, by a computer CPU such as the processor 24 in which the computer-readable medium is stored.

It should be appreciated that processes 1400-1900 may include any number of additional or alternative tasks, the tasks shown in FIGS. 14-22 need not be performed in the illustrated order, and processes 1400-1900 may be incorporated into a more comprehensive procedure or process having additional functionality not described in detail herein. In practical embodiments, portions of the processes 1400-1900 may be performed by different elements of the mobile phone 10 such as: the wireless communication circuit 14, the A/D converter 16, the D/A converter 20, the key input device 26, the display driver 28, the processor 24, the memory module 50, the touch panel control circuit 36, the acceleration sensor 40, the power supply circuit 42, etc. Process processes 1400-1900 may have functions, material, and structures that are similar to the embodiments shown in FIGS. 1-13. Therefore common features, functions, and elements may not be redundantly described here.

FIG. 14 is an illustration of a flow diagram showing an exemplary process 1400 for calculating a slide distance according to an embodiment of the disclosure. When the touch panel 38 is touched, and when the touch flag 350 is turned on, the processor 24 calculates the slide distance from a touched point and a current touched location (task S1). For example, the processor 24 may utilize the Pythagorean Theorem and may calculate the distance between two points. The processer 24 that executes a process of the task S1 functions as the slide distance calculation module.

Then, the slide distance is stored in the slide distance buffer 332 in the task S3. The processor 24 determines whether a release is detected or not in the task S5. For example, the processor 24 determines whether the slide flag 352/354 is turned off by a finger being released from the touch panel 38. If the task S5 is "NO," that is, if a finger is not released, the processor 24 returns to the task S1. The slide distance is repeatedly calculated until a finger is released. On the other hand, if the task S5 is "YES," that is, if a finger is released, the slide distance calculation process is terminated.

FIG. 15 is an illustration of a flow diagram showing an exemplary process 1500 for determining a slide direction according to an embodiment of the disclosure. For example, when the touch flag 350 is turned on, the vertical slide flag 352 is turned off in the task S21, and the horizontal slide flag 354 is turned off in the task S23. In other words, each flag is initialized. Next, the processor 24 determines whether the slide distance is longer than a predefined distance in the task S25. That is, if the direction is determined when the slide distance stored in the slide distance buffer 332 is extremely short, the battery block may be set by accident, or the capacity ratio may be unintentionally changed. For these reasons, it is determined whether the slide distance is longer than a given distance.

Next, the processor 24 calculates the slide angle from a touched point and a current touched location in the task S27. For example, taking the right side of the horizontal axis as 0 degree, and the touched point as the vertex of the angle, the angle of the touched location may be found. Next, the processor 24 determines whether the slide angle is within a predefined angle in the task S29. For instance, it is determined whether the slide angle is within a range from 45 degrees to 135 degrees or a range from 225 degrees to 315 degrees. If the task S29 is "YES" (for example, if the slide angle is 80 degrees,) the processor 24 sets the vertical slide flag 352 to be on (the task S31).

Otherwise, the task S29 is "NO" (for example, if the slide angle is 150 degrees,) the processor 24 sets the horizontal slide frag 354 to be on (the task S33). When either flag is set to on, the processor 24 determines whether a release is detected in the task S35. In other words, the processor 24 determines whether the touch flag 350 is set to be off or not. If the task S 35 is "NO," that is, if the touch continues, the processor 24 returns to the task S25. In contrast, the task S 35 is "YES," that is, if the finger is released from the touch panel 38, the processor 24 terminates the slide direction determination process.

FIG. 16 is an illustration of a flow diagram showing an exemplary process 1600 for determine set up function groups according to an embodiment of the disclosure. For example, when the power of the mobile phone 10 is turned on, the processor 24 determines whether the battery icon BI is pressed long (the task S51). Specifically, the processor 24 determines whether the touched time calculated by the touch counter 356 exceeds a predefined time when the touched point stored in the touch buffer 330 is within a coordinate range indicated in the battery icon coordinate data 348*a*. If the task S 51 is "NO," for example, if the touch operation is not performed on the battery icon BI, the process of the task S51 is repeated. If the task S 51 is "YES," for example, if the battery icon BIa shown in FIG. 2 is pressed long, the additional function list is created (task S53).

For example, the processor 24 retrieves from the RAM 34 a table for managing the added functions and further retrieves the corresponding function groups when the retrieved functions are in the function group data. The processor 24 an adding module creates a function group list, such as one shown in FIG. 3A, based on the retrieved functions and the function groups. Next, the processor 24 displays a setting screen including a additional function list on the display 30 (task S55). For instance, as shown in FIG. 3A, a setting screen comprising an additional function list is displayed on the display 30.

Next, the processor 24 determines whether a function group is touched or not in the task S57. In other words, the processor 24 determines if one of any fields in the column entitled "Function Groups" in the additional function list is touched. If the task S57 is "NO," for example, if a touch operation is not performed on the touch panel 38, the processer 24 executes the task S71. If the task S57 is "YES," for example, if the field that is corresponding to the "Photo" and is in the column of the function group as shown in FIG. 3B is touched, a list of the function groups is displayed in the task S59. In short, as shown in FIG. 3B, the pull-down menu P including the list of the function groups is displayed in the proximity of the touched field of the function groups.

Next, the processor 24 determines if a function group is specified in the task S61. For example, the processor 24 determines whether a touch operation is performed to specify any of the function groups, the "call," "browser," and "music," in the pull-down menu P shown in FIG. 3B. If the task S61 is "YES," for example, if a touch operation is performed on the function group, the "browser," the specified function group is set in the task S63. For instance, the "photo" is added in the row of the "browser" in the function group data. Then, the setting screen is displayed again in the task S65. In other words, the setting screen shown in FIG. 3C is displayed on the display 30 to inform a user that the "browser" is set for the "photo." When the process of the task S65 is completed, the processer 24 executes the process of the task S71. The processor 24 that executes the process of the task S63 functions as a function group setting module.

In contrast, the task S61 is "NO," that is, if a touch operation is not performed on the function group in the pull-down menu P, the processer 24 determines if the "New Group" is specified (the task S67). In short, the processer 24 determines if a touch operation is performed on the Add New Group displayed at the top of the pull-down menu P. If the task S67 is "NO," that is, if the pull-down menu P remains displayed and if a touch operation is not performed, the processer 24 executes the process of the task S61 again. In contrast, the task S67 is "YES," that is, if a touch operation is performed on the "New Group", the processor 24 executes the process of creating a new group (task S69). That is, the processes to name the function group and to set a consumed current are executed.

Next, the processor 24 determines if an exit operation is performed in the task S71. For instance, the processor 24 may determine if a home key is operated as an exit operation. If the task S71 is "NO," that is, if an exit operation is not detected, the processer 24 executes the process of S57. In contrast, if the task S71 is "YES," that is, if an exit operation is detected, the processer 24 terminates the function group setting process.

FIG. 17 is an illustration of a flow diagram showing an exemplary process 1700 for controlling a power supply according to an embodiment of the disclosure. For example, when the power of the mobile phone 10 is turned on, the processor 24 determines if a double-tap is performed on the battery icon BI (the task S81). In other words, the processor 24 determines if a double-tap is performed within a coordinate range indicated by the battery icon coordinate data 348*a*. If the task S81 is "NO," for example, if a double-tap is not detected, the processor 24 repeats the process of the task S81. On the other hand, if the task S81 is "YES," for example, if a double-tap to the battery icon BIa shown in FIG. 2 is detected, the processer 24 retrieves the remaining battery capacity (the task S83). In short, the processer 24 retrieves the remaining battery capacity of the secondary cell 44 from the remaining battery capacity buffer 336. Next, the processor 24 retrieves the battery setting data 342 (the task S85).

Next, the processor 24 determines if a battery block is set in the task S87. That is, the processor 24 determines if a battery block, such as one shown in FIG. 6B, is recorded in the battery setting data 342. If the task S87 is "NO," for example, if the battery block, such as one shown in FIG. 6A, is not recorded in the battery setting data 342, the processer 24 calculates the estimated time (the task S89). The processer 24 calculates the estimated time for each function group recorded in the battery setting data 342 based on the retrieved remaining battery capacity and the consumed current in the function group data 344 and stores the calculated result in a estimated time buffer 340.

Next, the processor 24 causes the display 30 to display the first battery image BGa. For example, the processor 24 displays on the display 30 the first battery image BGa indicating the remaining battery capacity to the full capacity of the secondary cell 44 based on the remaining battery capacity retrieved in the task S83. The processor 24, for example, displays a battery group on the display 30 in the task S93.

For example, the processor 24 retrieves a function group from the battery setting data 342 and retrieves the estimated time corresponding to the retrieved function group from the estimated time buffer 338. Then, the processor 24 displays the retrieved function groups and the estimated time on the display 30. Thus, the display 30 displays the detail screen, such as one shown in FIG. 5A. When the process of the task S93 is completed, the processor 24 executes the process of the task S103. The processor 24 that executes the process of the task S93 may function as a first display module.

The task S87 is "YES," that is, if a battery block is recorded in the battery setting data 342, the processor 24 calculates the remaining battery block capacity (the task S95). That is, the processor 24 re-calculates the remaining battery block capacity of each battery block based on the remaining battery capacity retrieved in the task S83 and the capacity ratio to the full capacity recorded in the battery setting data 342. The processor 24 calculates the estimated time for each battery group in the task S97. For example, in the battery setting data 342 shown in FIG. 9, the processor 24 calculates the estimated time for respective function groups of "Call" and "Browser" in the first battery group based on the remaining battery block capacity of the first battery block and the function group data 344.

The processor 24 also calculates the estimated time for the function group of the "music" in the second battery group based on the remaining battery block capacity of the second battery block and the function group data 344. The calculated estimated time is stored in the estimated time buffer 340. Next the processor 24 displays the second battery images BGb and BGc on the display 30 in the task S99. That is, the processor 24 displays the second battery images BGb and BGc on the display 30 based on the re-calculated remaining battery block capacity and each capacity ratio. In the task S101, the processor 24 displays each battery group on the display 30. For example, the second battery image BGb and the second battery image BGc are displayed in association with the first battery group and the second battery group. Thus, a detail screen, such as one shown in FIG. 8A, is displayed on the display 30.

The processor 24 executes the setting process in the task S103. This setting process is discussed in more detail in the context of discussion of FIG. 18 below.

The processer 24 determines if an operation performed by a user is an exit operation or not in the task S105. For example, the processor 24 determines if a home key is operated or not. If the task S105 is "NO," that is, if an exit operation is not performed, the processor 24 determines if the setting is modified (the task S107). In other words, the processor 24 determines if the battery setting data 342 is modified by a setting process. If the task S107 is "NO," that is, if the battery setting data 342 is not modified, the processor 24 executes the process of the task S103.

If the task S107 is "YES," for example, if a battery block is set and the battery setting data 342 changes from FIG. 6A to FIG. 6B, the processor 24 updates a battery image displayed on the display 30 (the task S109). For example, the processor 24 displays the second battery images BGb and BGc shown in FIG. 5D in the function display area 62 in place of the first battery image BGa shown in FIG. 5A. Next, the processor 24 updates the display of the battery group (the task S111) and executes the process of the task S103. For example, the processor 24 displays the first battery group and the second battery group shown in FIG. 5D in the function display area 62 in place of the battery group shown in FIG. 5.

If the task S105 is "YES," that is, if an exit operation is detected, the processor 24 also terminates the battery control process.

The processor 24 executing the process of the task S109 functions as a second display module, and the processor 24 executing the process of the task S111 functions as a third display module.

FIG. 18 is an illustration of a flow diagram showing an exemplary setting process according to an embodiment of the disclosure. When the task S103 is executed during the battery setting process shown in FIG. 17, the processor 24 determines if a touch is detected within the effective area ET (the task S131). That is, the processor 24 determines if a touched point is within the coordinate range of the effective area ET, which is within the coordinate range of the battery image coordinate data 348b. If the task S131 is "YES," for example, if a touch is detected within the effective area Eta shown in FIG. 5 A, the processor 24 displays the parting line DL on the display 30 (the task S133). In short, as shown in FIG. 5B, the parting line DL is displayed based on the coordinate of the touched location stored in the touch buffer 330. When the parting line DL is displayed, the auxiliary line GL and the pointer Po are also displayed on the display 30.

Next, the processor 24 sets virtual battery blocks based on the parting line DL (the task S135). For example, as shown in FIG. 5B, the processor 24 sets the left side of the parting line DL to be a first virtual battery block and a right side of the parting line DL to be the second virtual battery block. Then, the processor 24 calculates the capacity ratio and the remaining battery block capacity (the task S137). For example, when the parting line DL is at the location of "7" as shown in FIG. 5B, it means that the first virtual battery block account for 70 percent of the full capacity and that the second virtual battery block accounts for 30 percent of the full capacity.

Then, the remaining battery block capacity is calculated in a same manner as the capacity ratio. For example, when the parting line DL is at the location of "7," and when the remaining battery capacity is "80," the remaining battery block capacity of the first battery block is "56," and the remaining battery block capacity of the second battery block is "24." The capacity ratio and the remaining battery block capacitys are temporarily stored in the battery setting buffer 338.

Next, the processor 24 calculates estimated time (the task S139). For example, the processor 24 calculates estimated time for the function groups (the "call," "browser," and "music") shown in FIG. 5A based on the remaining battery block capacity of the first virtual battery block stored in the battery setting buffer 338. The each calculated estimated time is stored in the estimated time buffer 340. The processor 24 updates the display of the battery groups (the task S141). For example, the processor 24 updates the content displayed in the function display area 62 with a content, such as one shown in FIG. 5B, by changing the estimated time for each function group shown in FIG. 5A to the estimated time calculated in the task S139.

Next, the processor 24 determines if a touched location slides to right and left. In other words, the processor 24 determines if the horizontal slide flag 354 is on or not. If the task S143 is "YES," for example, if a user changes the touched location to right and left along the auxiliary line GL, the processor 24 executes the process of the task S133. On the other hand, if the task S143 is "NO," that is, if a user does not move the touched location to right and left, the processor 24 determines if a release is detected or not. That is, for example, the processor 24 determines if the touch flag 350 is turned off by a finger being released from the touch panel 38. If the task S145 is "YES," that is, if a release is detected, the processer 24 terminates the setting process and returns to the battery control process.

If the task S145 is "NO," that is, if a release is not detected, the processer 24 determines if a touched location slides downward (the task S147). The processer 24 determines if the vertical slide flag 352 is on and if the current touched location is below the touched point. If the task S147 is "NO," that is, if a touched location does not slide downward, the processer 24 executes the task S143. By contrast, if the task S147 is "YES," for example, if a downward slide is detected as shown in FIG. 5C, the processer 24 updates the battery setting data (task S149). In short, the processer 24 updates the battery setting data based on a capacity ratio and a remaining battery block capacity of the first virtual battery block and the second virtual battery block stored in the battery setting buffer 338. Thus, the setting of the battery block is established, and the calculation of the capacity ratio and the remaining battery block capacity is finalized and is formally allocated to a function group. When the process of the task S149 is completed, the processer 24 returns to the battery control process.

Otherwise, when a touch is not detected within the effective area ET, the processer 24 terminates the setting process and returns to the battery control process after executing the editing process (task S151). The editing process is discussed in detail after the next paragraph, and the explanation is omitted.

The processer 24 that executes the processes of the tasks S135 and S149 may functions as a setting module. The processer 24 that executes the tasks S135, S137, and S149 may also function as a calculation module. The processer 24 that executes the task S149 may also function as a function allocation module. The processer 24 that executes the tasks S139 and S149 may also function as a time calculation module.

FIGS. 19-22 is an illustration of a flow diagram showing an exemplary setting process according to an embodiment of the disclosure. When the foregoing editing process is executed, the processer 24 determines if a touch is detected within an area where a function group is displayed (the task S171). For example, the processer 24 determines if a function group, such as the "music," is touched, as shown in FIG. 7A, based on the touched point stored in the menu coordinate data 348c and the touch buffer 330. If the task S171 is "NO," that is, if a touch is not detected in an area where a function group is displayed, the processer 24 executes the process of the task S191 in FIG. 20.

If the task S171 is "YES," for example, if a user touches the function group of the "music," as shown in FIG. 7A, the processer 24 highlights the touched function group (task S173). For example, as shown in FIG. 7A, the processer 24 adds an underline below the text of the touched function group and changes the typeface to the bold, italic typeface. Next, the processer 24 determines if a release is detected (task S175). That is, the processer 24 determines if the touch flag 350 is turned off. If the task S175 is "YES," that is, if a release is detected, the processer 24 deactivates the highlight (task S177). That is, the processer 24 returns the text of the function group to its original state. When the process of the task S177 is completed, the processer 24 terminates the editing process and returns to the setting process.

If the task S175 is "NO," that is, if a touch by a user continues, the processer 24 determines if the touched location is moved to an area where another battery group is displayed (task S179). That is, the processer 24 determines if the touched location enters into the display range of another second battery group, indicated by the menu coordinate data 348c. If the task S179 is "NO," for example, if the touched location does not enter into the display range of another second battery group, the processer 24 returns to the process of the task S175. If the task S179 is "YES," for example, if the touched location enters into the display range of the second battery group as shown in FIG. 7A, the processer 24 calculates the estimated time for a highlighted function group (task S181).

In other words, the processer 24 retrieves the consumed current for the touched function group from the function group data 344, retrieves the remaining battery block capacity of the battery block corresponding to the battery group where the touched location is, and calculates the estimated time for the highlighted function group. When the process of the task S181 is completed, the battery setting data, in which the function group, the "music," is recorded in the second battery block, is stored in the battery setting buffer 340, and the calculated estimated time is stored in the estimated time buffer 340. In other words, the function group of the "music" is temporarily allocated to the second battery block. In addition, the processer 24 that executes the process of the task S181 may function as a time calculation module.

Next, the processer 24 updates the display of battery groups (the task S183). For example, as shown in FIGS. 7A and 7(B), the processer 24 updates the display of the first battery group and the second battery group. Then, the processer 24 determines if a release is detected within another battery group. For example, the processer 24 determines if the touch flag 350 is turned off when the coordinate of the touched location is within the display range of the second battery group shown in FIG. 7A. If the task S185 is "NO," that is, if a release is not detected, the processer 24 returns to the process of the task S179.

If the task S185 is "YES," for example, if a finger is released within the display range of the second battery group, the processer 24 updates the battery setting data (the task S187). In short, the battery setting data 342 is updated based on the content stored in the battery setting buffer 340. Thus, the allocation of the music function group to the second battery block is finalized. When the process of the task S187 is completed, the processer 24 terminates the editing process and returns to the setting process.

Additionally, the processer 24 that executes the processes of the tasks S183 and S187 may function as an allocation module.

Figure 20:
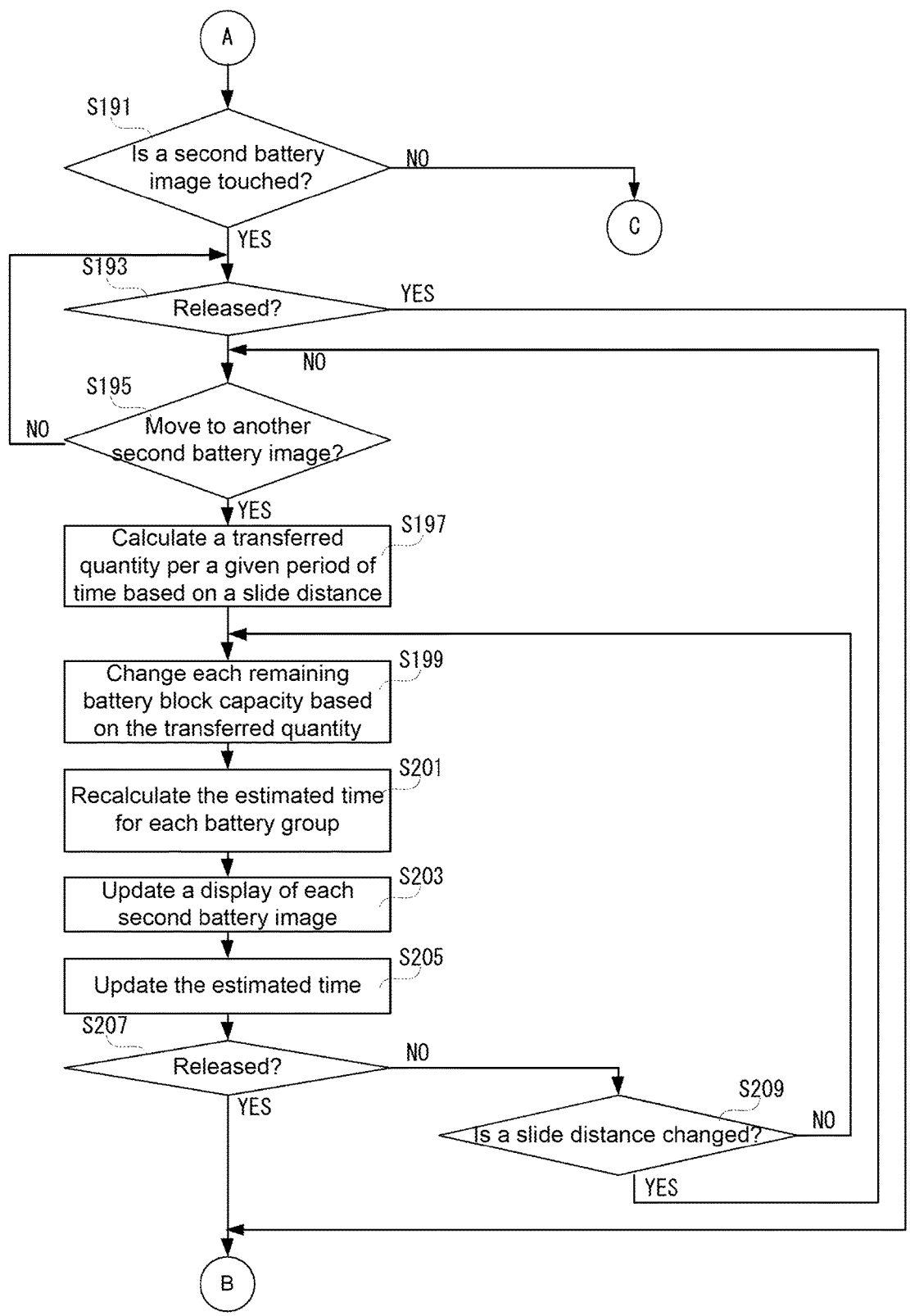

Next, in the task S191 shown in FIG. 20, the processer 24 determines if a user is touching the second battery image BGb and BGc. In other words, the processer 24 determines if a touch is detected either within the effective area ETb of the second battery image BGb or within the effective area ETc of the second battery image BGc based on the battery image coordinate data 348a. If the task S191 is "NO," that is, if the both second battery images are not touched, or if a touch is detected within the both effective areas of the second battery images, the processer 24 proceeds to the task S221 in FIG. 21.

Otherwise, if the task S191 is "YES," for example, if a touch is performed within the effective area ETc of the second battery image BGc as shown in FIG. 8(A), the processer 24 determines if a release is detected (the task S187). If the task S193 is "YES," that is, if a user releases his/her finger from the touch panel 38, the processer 24 terminates the editing process and returns to the setting process. If the task S193 is "NO," that is, if a user does not release his/her finger, the processer 24 determines if a touched location is moved into the display area of the other second battery image (the task S195). In other words, the processer 24 determines if a touched location is within the effective area ET of another second battery image BG based on the battery image coordinate data 348*a*. If the task S195 is "NO," for example, if the touched location remains within the effective area ETc, the processer 24 executes the process of the task S193.

If the task S195 is "YES," for example, if the touched location is moved into the touch effective area ETb of the second battery image BGb, the processer 24 calculates the transferred quantity per a given period of time based on the slide distance (the task S197). That is, the transferred quantity is calculated in such a way that longer the slide distance is, more the transferred quantity becomes. Next, the processer 24 changes each remaining battery block capacity based on the transferred quantity (the task S199).

For example, when a touched point is within the effective area ETc of the second battery image BGc shown in FIG. 8A, when the current touched location is within the effective area ETb of the second battery image BGb, and when the transferred quantity is "3," the processer 24 subtracts the transferred quantity, "3," from the remaining battery block capacity (for example, "24") of the second battery image BGc where a touched point is in the battery setting data 342.

Then the processer 24 adds the transferred quantity, "3," to the remaining battery block capacity (for example, "56") of the second battery image BGb where the touched location is. The process of the task S199 is repeated until a release is performed, and therefore, the remaining battery block capacity changes based on how long a touch continues.

Next, the processer 24 recalculates the estimated time for each battery group (the task S201). For example, the processer 24 recalculates the estimated time for the function groups included in the first battery group and the second battery group based on the battery setting data 342, in which the remaining battery block capacity is changed. In addition, the processer 24 that executes the process of the task S197 may function as a first transferred quantity calculation module. The processer 24 that executes the processes of the tasks S197-S201 may function as a changing module.

Next, the processer 24 updates the display of the respective second battery images BGb and BGc (task S203). In other words, according to the changes of the remaining battery block capacity in the battery setting data 342, the display of the respective second battery images BGb and BGc is updated. The processer 24 updates the estimated time (task S205). That is, the processer 24 changes each estimated time in the first battery group and in the second battery group to the estimated time recalculated in the task S201.

Next, the processer 24 determines if a release is detected or not (task S207). That is, the processer 24 determines if the touch flag 300 is turned off. If the task S207 is "NO," that is, if a release is not performed, the processer 24 determines if the slide distance changes (task S209). In short, the processer 24 determines if the slide distance stored in the slide distance buffer 332 changes or not. If the task S209 is "NO," that is, if the slide distance does not change, the processer 24 returns to the task S199 to continue to change the remaining battery block capacity. If the task S209 is "YES," that is, if the slide distance changes, the processer 24 returns to the task S195 to determine if the touched location goes out of another second battery image or to recalculate the transferred quantity. If the task S207 is "YES," that is, if a release is performed, the processer 24 terminates the editing process and returns to the setting process.

If the slide direction is the opposite direction, the remaining battery block capacity also changes in reverse. In other words, the remaining battery block capacity of the first battery block reduces, and the remaining battery block capacity of the second battery block increases instead.

Figure 21:
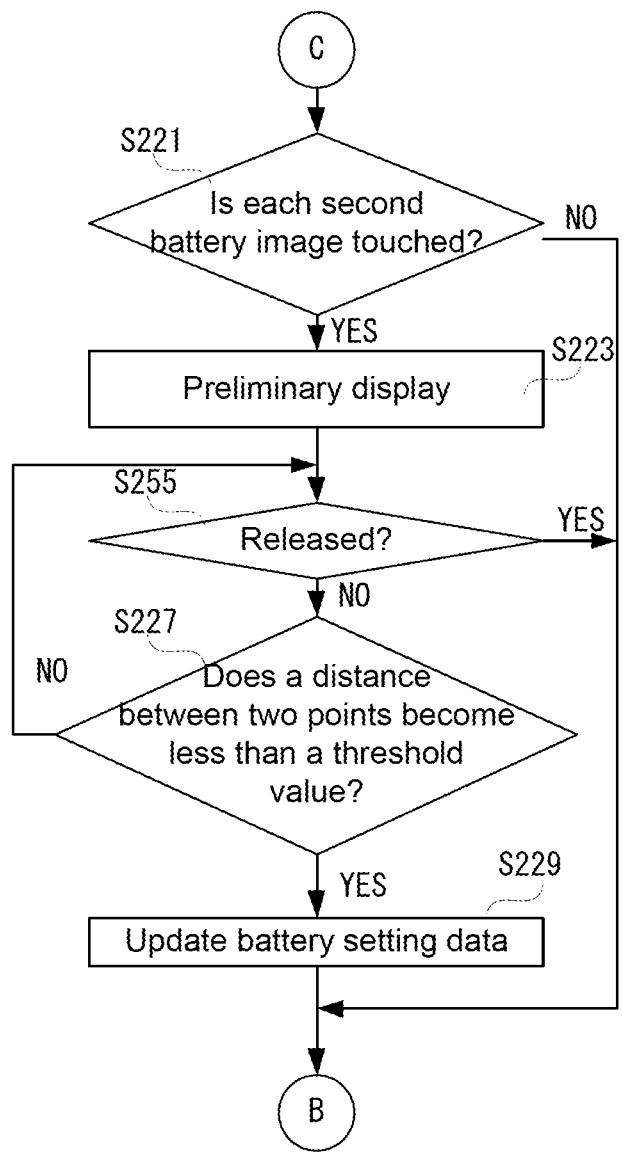

Next, in the task S221 shown in FIG. 21, it is determined if the respective second battery images BGb and BGc are touched. For example, as shown in FIG. 11A, the processer 24 determines if a multi-touch is detected by detecting a touch from the respective second battery images BGb and BGc. If the task S221 is "NO," that is, if a multi-touch is not performed as shown in FIG. 11A, the processer 24 terminates the editing process and returns to the setting process. If the task S221 is "YES," for example, if a multi-touch is detected as shown in FIG. 11A, the processer 24 displays a preliminary display (task S223). For example, as shown in FIG. 11A, the arrows for encouraging two fingers to move closer to each other are displayed as the preliminary display.

Next, the processer 24 determines if a release is detected (the task S225). In other words, it is determined if two fingers are released from the touch panel 38. If the task S225 is "YES," that is, if two fingers are released from the touch panel 38, the processer 24 terminates the editing process and returns to the setting process. If the task S225 is "NO," that is, if two fingers are not released from the touch panel 38, the processer 24 determines if the distance between two points become less than a threshold value (task S227). In other words, it is determined if the distance of the touched locations specified by two fingers becomes shorter than the threshold value. If the task S227 is "NO," for example, if the distance between two points does not change, the processer 24 returns to the process of the task S225.

Otherwise, if the task S227 is "YES," for example, if a user touches and then performs an operation, such as pinching the two second battery images BGb and BGc, as shown in FIG. 11A, the distance between two points become less than the threshold value. Therefore, the processer 24 updates the battery setting data (task S229). For example, the battery setting data 342 shown in FIG. 9 is updated to the battery setting data 342 shown in FIG. 6A. In other words, the processer 24 deactivates the battery block that has been set up. When the process of the task S229 is completed, the processer 24 terminates the editing process and returns to the setting process. The processer 24 that executes the process of the task S229 may function as a deactivation module.

In FIG. 8A, the processer 24 may change the remaining battery block capacity of each battery block when the acceleration sensor 40 detects an operation of tilting the position of the mobile phone 10. Specifically, the processer 24 calculates the transferred quantity based on the output from the acceleration sensor 40 and changes the remaining battery block capacity based on the transferred quantity and how long the mobile phone 10 is tilted. Thus, a user may intuitively change the remaining battery block capacity by a simple operation of tilting the mobile phone 10.

Figure 22:
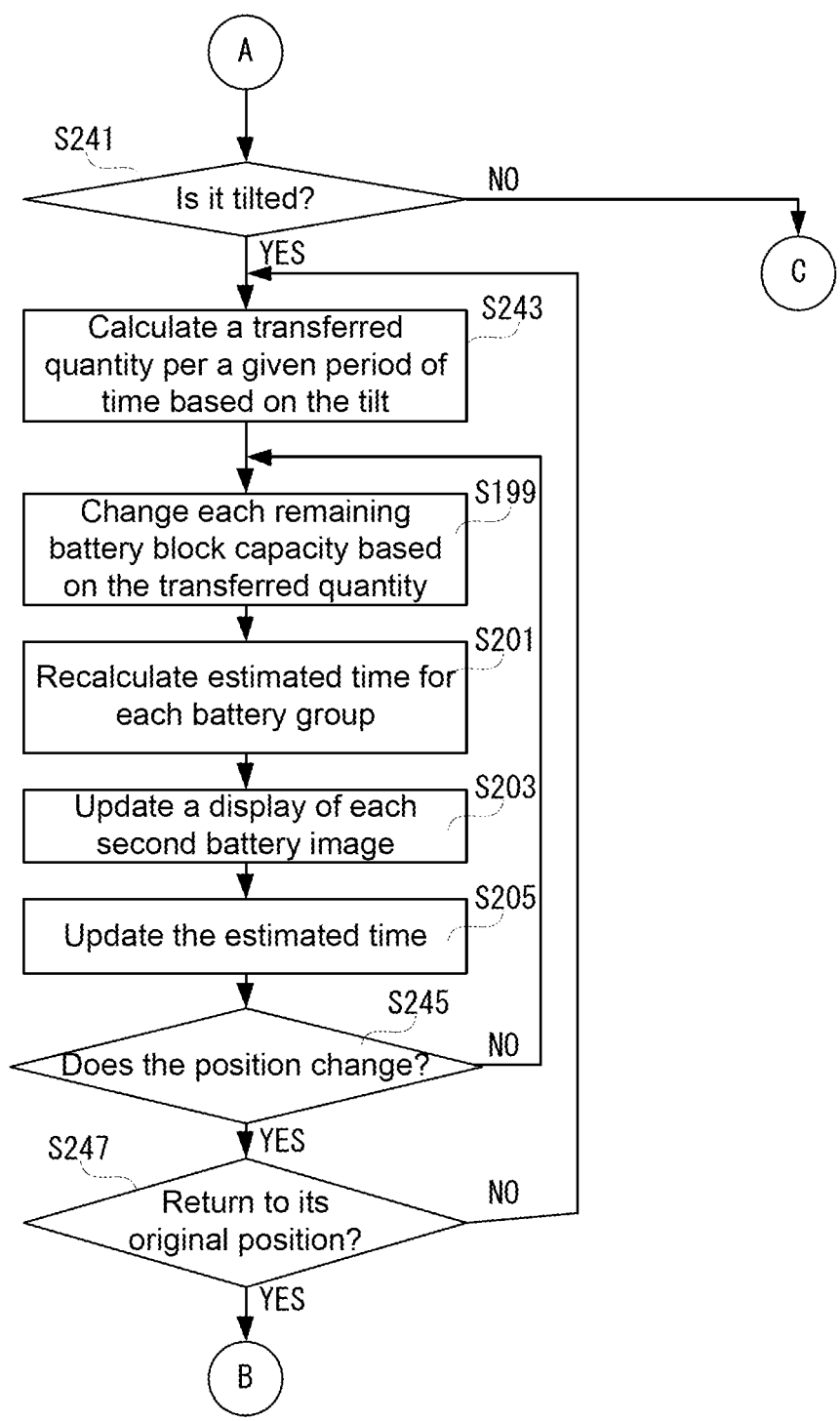

Additionally, the process of using the acceleration sensor 40 is discussed with reference to the flow diagram in FIG. 22. The detailed explanation is omitted as to the processes that have been explained.

During the editing process, the processer 24 determines if the mobile phone 10 is tilted in the task S241. In other words, the processer 24 determines if the mobile phone 10 is tilted in either direction of right or left according to the acceleration data stored in the acceleration buffer 334. If the task S241 is "NO," that is, if the position of the mobile phone 10 does not change, the processer 24 proceeds to the task S221 shown in FIG. 21.

If the task S241 is "YES," for example, if the mobile phone 10 is tilted in such a way that the second battery image BGb shown in FIG. 8A is on the lower side, the processor 24 calculates the transferred quantity per a given period of time based on the tilt (task S243). For example, the processor 24 calculates the transferred quantity, such that more tilted the mobile phone 10 is, greater the transferred quantity becomes.

Next, the processor 24 changes each remaining battery block capacity based on the transferred quantity (task S199). In other words, the processor 24 changes each remaining battery block capacity in such a way that the battery block located in the lower side has more remaining battery block capacity. The processor 24 recalculates the estimated time for each battery group (task S201), updates the display of each second battery image (the task S203), and updates the estimated time (task S205).

Then, the processor 24 determines if the position of the mobile phone 10 is changed in the task S245. In other words, the processor 24 determines if the acceleration data stored in the acceleration buffer 334 is changed. If the task S245 is "NO," that is, if the position is not changed, the processor 24 returns to the process of the task S199. On the other hand, if the task S245 is "YES," that is, if the position of the mobile phone 10 is changed, the processor 24 determines if the position of mobile phone 10 is restored (task S247). The processor 24 determines if the position of the mobile phone 10 returns to the state before being tilted based on the acceleration data stored in the acceleration buffer 334.

If the task S247 is "NO," that is, if the position of the mobile phone 10 is not restored, the processor 24 returns to the task S243. On the other hand, if the task S247 is "YES," that is, if the position of the mobile phone 10 is restored, the processor 24 terminates the editing process and returns to the setting process. The processor 24 that executes the process of the task S243 may function as a changing module and a second transferred quantity calculation module.

In the present embodiment, the processor 24 may deactivate battery blocks, if an input operation of shaking the mobile phone 10 is performed when a plurality of battery blocks is displayed. In this case, a multi-touch in a display range of the respective battery blocks is not necessary, even if more than three battery blocks are set. As a result, the setting is more easily deactivated.

Figure 23:
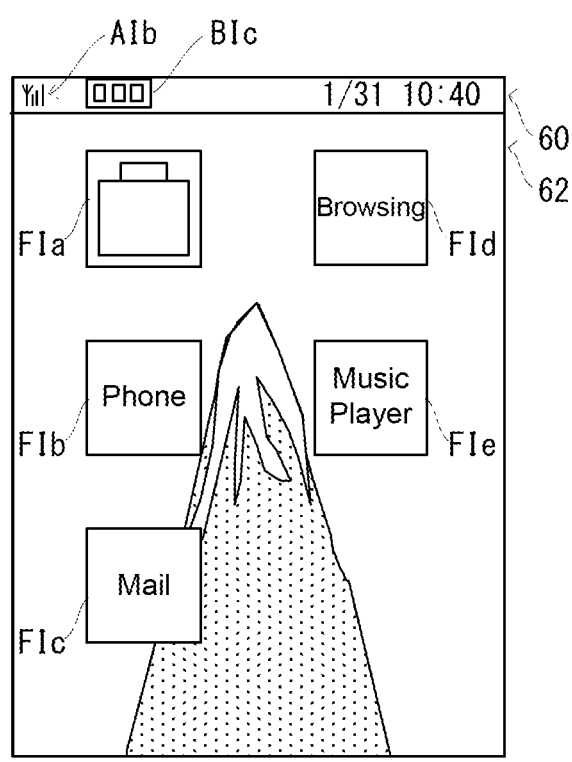
FIG. 23 is an illustration of an exemplary standby screen displayed on the display shown in FIG. 1 according to an embodiment of the disclosure.

Additionally, in an embodiment, the function icon FIa for executing the battery control function may be displayed on the standby screen of the mobile phone 10, instead of the battery icon BIa, as shown in FIG. 23. In this case, the antenna icon AIb and the battery icon BIc, whose display areas are small, are displayed in the condition display area 60. The function icon FIb for executing a phone function, the function icon FIc for executing a mail function, the function icon FId for executing a browsing function, and the function icon FIe for executing a music player function are also displayed on the standby screen. A user may cause to display the setting screen by pressing long the function icon FIa and to display the detail screen by a double-tap.

An input operation similar to a touch operation may be detected by using a pointing device, such as a touch pad, a track ball, a mouse and other devices, instead of using the touch panel control circuit 36 and the touch panel 38.

In the present embodiment, a gyro sensor, instead of the acceleration sensor 40, may detect the tilt of the mobile phone 10.

In the present embodiment, the call function group may also be set for two battery groups. In other words, a function group may be respectively set for a plurality of battery groups at a same time. Furthermore, a function may be directly allocated to a battery group.

In addition, a plurality of programs used in the subject embodiment may be stored in the hard disk drive (HDD) in the server for data distribution and may be distributed to the mobile phone 10 through networks. The programs may be stored in a storage medium, such as a USB memory, a memory card, and an optical disk, such as a CD, DVD, and Blue-ray Disc (BD). Then, the storage media may be sold or distributed. When a plurality of programs downloaded through the above-mentioned server or storage media is installed in a mobile phone with the similar configuration of the subject embodiment, the same effect as in the subject embodiment is enjoyed.

Specific values/numbers discussed in this detailed description, such as battery capacity, a remaining battery capacity, a capacity ratio, a remaining battery block capacity, and other values/numbers, are all mere examples and may be arbitrarily changed according to a change to product specifications.

In this document, the terms "computer program product", "computer-readable medium", and the like may be used generally to refer to media such as, for example, memory, storage devices, storage unit, or other non-transitory media. These and other forms of computer-readable media may be involved in storing one or more instructions for use by the processor 24 to cause the processor 24 to perform specified operations. Such instructions, generally referred to as "computer program code" or "program code" (which may be grouped in the form of computer programs or other groupings), when executed, enable a method of using a system such as the mobile phone 10.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
   a battery;
   a user interface that receives an input operation by a user;
   a memory that stores a plurality of functions;
   a sensor that measures a remaining battery capacity of the battery;
   a display that displays a first image indicating the remaining battery capacity and full capacity of the battery;
   at least one processor configured to:
   set a plurality of battery blocks by dividing the full capacity of the battery into at least two, if a first input operation is entered when the first image is displayed;
   calculate a capacity ratio based on capacity of each of battery blocks of the battery and the full capacity of the battery;
   calculate a remaining battery block capacity of each of the battery blocks based on the capacity ratio;
   allocate at least one function to at least one of the battery blocks;
   control the display to display a plurality of second images indicating the capacity ratio and the remaining battery block capacity of a corresponding battery block;
   control the display to display the at least one function allocated to the at least one of the battery blocks for the at least one of the second images, when the battery blocks are set;
   deactivate the battery blocks; and
   control the display to display the first image in place of the plurality of second images when the battery blocks set are deactivated.

2. The mobile electronic device according to claim 1,
   wherein the memory stores the at least one function in a state where the at least one function is classified into at least one of function groups,
   wherein the processor allocates a function group to the at least one of the battery blocks, and
   wherein the processor controls the display to display the function group on the at least one of the second images.

3. The mobile electronic device according to claim 2 further comprising:
   a timer that calculates an estimated time for a function classified in the function group to be used based on the remaining battery block capacity and data, when the function group is allocated,
   wherein the processor controls the display to display the function group allocated to the at least one battery block and the estimated time for the at least one of the second images, and
   wherein the memory module stores data in which the function group is associated with a value of a consumed current for the function group for a predefined time.

4. The mobile electronic device according to claim 1,
   wherein the user interface includes a touch panel that detects a touch operation by the user as the first input operation, and
   wherein the processor sets the battery blocks that the full capacity of the battery is divided into, according to the touch operation on the first image.

5. The mobile electronic device according to claim 4, wherein the processor deactivates the battery blocks set up based on a multi-touch to the second images.

6. The mobile electronic device according to claim 4,
   wherein the processor deactivates the battery blocks set up, when a first touch to one of the second images and a second touch to another second image from among the second images are simultaneously detected.

7. The mobile electronic device according to claim 1,
   wherein the user interface includes a touch panel that detects a plurality of types of touch operations by the user as the first input operation, and
   wherein the processor sets the battery blocks that the full capacity of the battery is divided into according to the types of the touch operations on the first image.

8. The mobile electronic device according to claim 1,
   wherein the processor changes the remaining battery block capacity when the user interface receives a second input operation.

9. The mobile electronic device according to claim 8,
   wherein the user interface includes a touch panel that detects a touch operation by the user,
   wherein the processor calculates a slide distance when the touch operation of a slide is detected on the touch panel,
   wherein the processor calculates a transferred quantity according to the slide distance, when the touch operation of the slide on the battery block images is detected, and
   wherein the processor changes the remaining battery block capacity calculated for each of the battery blocks based on the transferred quantity.

10. The mobile electronic device according to claim 8,
    wherein the user interface includes an accelerometer that detects a detected tilt of the mobile electronic device as the input operation,
    wherein the processor that calculates a second transferred quantity according to the detected tilt, when the detected tilt is detected while the second images are displayed, and
    wherein the processor changes the remaining battery block capacity based on the second transferred quantity.

11. The mobile electronic device according to claim 8,
    wherein the user interface includes a touch panel that detects a touched location where the user touches the touch panel,
    wherein the processor calculates a calculated slide distance when the touched location moves,
    wherein the processor calculates a first transferred quantity according to the calculated slide distance when a move of the touched location is detected from one of the second images to another second image from among the second images, and
    wherein the processor changes a first remaining battery capacity of the one of the second images and a second remaining battery capacity of the another second image based on the first transferred quantity.

12. The mobile electronic device according to claim 1,
    wherein the at least one function comprises an arbitrarily added function, and
    wherein the processor allocates the arbitrarily added function to the at least one of the battery blocks.

13. The mobile electronic device according to claim 12,
    wherein the processor sets the function group for the arbitrarily added function.

14. The mobile electronic device according to claim 13,
    wherein the processor adds a function group,
    wherein the sensor measures a measured value of a consumed current, when a function in a function group is added to obtain an added function group, and when the function in the added function group is executed, and
    wherein the processor sets the measured value in data stored in the memory.

15. A method for controlling a mobile electronic device comprising a battery, the method comprising:
- measuring a remaining battery capacity of the battery;
- displaying a first image indicating the remaining battery capacity and full capacity of the battery;
- setting a plurality of battery blocks by dividing the full capacity of the battery into at least two, if a first input operation is entered when the first image is displayed;
- calculating a capacity ratio based on capacity of each of the battery blocks and the full capacity;
- calculating a remaining battery block capacity of each of the battery blocks based on the capacity ratio;
- allocating at least one function to at least one of the battery blocks;
- displaying a plurality of second images indicating the capacity ratio and the remaining battery block capacity;
- displaying the at least one function allocated to the at least one of the battery blocks for the at least one of the second images, when the battery blocks are set;
- receiving a deactivation operation by a user to deactivate the battery blocks;
- deactivating the battery blocks when the deactivation operation is received; and
- displaying the first image in place of the second images when the battery blocks are deactivated.

16. The method of claim 15 further comprising changing the remaining battery block capacity when receiving a second input operation.

17. The method of claim 15 further comprising:
- calculating an estimated time for a function classified in a function group to be used based on the remaining battery block capacity and data, when the function group is allocated;
- displaying the function group allocated to the at least one battery block and the estimated time for the at least one of the second images; and
- storing data in which the function group is associated with a value of a consumed current for the function group for a predefined time.

18. A non-transitory computer readable storage medium storing computer-executable instructions for a mobile electronic device including a processor,
- wherein the instructions, when executed by the processor, causing the mobile electronic device to perform:
- measuring a remaining battery capacity of a battery;
- displaying a first image indicating the remaining battery capacity and full capacity of the battery;
- setting a plurality of battery blocks by dividing the full capacity of the battery into at least two, if a first input operation is entered when the first image is displayed;
- calculating a capacity ratio based on capacity of each of the battery blocks and the full capacity;
- calculating a remaining battery block capacity of each of the battery blocks based on the capacity ratio;
- allocating at least one function to at least one of the battery blocks;
- displaying a plurality of second images indicating the capacity ratio and the remaining battery block capacity in place of the first image;
- displaying the at least one function allocated to the at least one of the battery blocks for the at least one of the second images, when the battery blocks are set;
- deactivating the battery blocks when a deactivation operation is entered; and
- displaying the first image in place of the second images when the battery blocks are deactivated.

19. The non-transitory computer readable storage medium of claim 18,
- wherein the instructions, when executed by the processor, causing the mobile electronic device to perform:
- changing the remaining battery block capacity when receiving a second input operation.

20. The non-transitory computer readable storage medium of claim 18,
- wherein the instructions, when executed by the processor, causing the mobile electronic device to perform:
- calculating an estimated time for a function classified in a function group to be used based on the remaining battery block capacity and data, when the function group is allocated;
- displaying the function group allocated to the at least one battery block and the estimated time for the at least one of the second images; and
- storing data in which the function group is associated with a value of a consumed current for the function group for a predefined time.

* * * * *